US006232036B1

(12) United States Patent
Suzuki et al.

(10) Patent No.: US 6,232,036 B1
(45) Date of Patent: *May 15, 2001

(54) OPTICAL RECORDING DISK

(75) Inventors: Yuki Suzuki; Yuko Okamoto; Michikazu Horie; Yutaka Kurose; Shuuichi Maeda, all of Kanagawa (JP)

(73) Assignee: Mitsubishi Chemical Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/992,899

(22) Filed: Dec. 18, 1997

(30) Foreign Application Priority Data

Dec. 18, 1996 (JP) .................................................. 8-338199
Jan. 20, 1997 (JP) .................................................. 9-007355

(51) Int. Cl.[7] .................................................. G11B 7/24
(52) U.S. Cl. .................................. 430/270.16; 430/725.1; 430/945; 369/288; 369/284; 428/913; 428/914; 428/64.8; 428/64.4
(58) Field of Search .................. 430/270.15, 270.16, 430/275.1, 945; 369/275.4, 288, 284; 428/913, 914, 64.8, 64.4

(56) References Cited

U.S. PATENT DOCUMENTS

| | | | |
|---|---|---|---|
| 5,298,608 | * | 3/1994 | Maruyama et al. ................ 430/945 |
| 5,389,419 | * | 2/1995 | Maeda et al. ...................... 430/945 |
| 5,415,914 | * | 5/1995 | Arioka et al. ...................... 430/945 |
| 5,492,744 | * | 2/1996 | Koike et al. ....................... 430/945 |
| 5,500,301 | * | 3/1996 | Onishi et al. ...................... 428/457 |
| 5,536,548 | | 7/1996 | Yasukawa et al. ............. 430/270.12 |
| 5,592,464 | * | 1/1997 | Sugaya et al. .................... 369/275.4 |
| 5,633,106 | * | 5/1997 | Aihara et al. .................... 430/270.15 |
| 5,652,037 | * | 7/1997 | Ohkawa et al. ................... 430/945 |
| 5,753,413 | * | 5/1998 | Nishida et al. ................... 430/945 |
| 5,853,872 | * | 12/1998 | Shimamori et al. ............... 428/332 |
| 5,858,613 | * | 1/1999 | Monden et al. ............. 430/270.16 |
| 5,862,123 | * | 1/1999 | Horie et al. ...................... 369/275.4 |
| 5,939,163 | * | 8/1999 | Ueno et al. ................... 430/270.14 |

FOREIGN PATENT DOCUMENTS

| | | | | |
|---|---|---|---|---|
| 0755052 | * | 1/1997 | (EP) | ......................... 430/270.16 |
| 4-361088 | * | 12/1992 | (JP) | ......................... 430/270.16 |
| 5-279580 | * | 10/1993 | (JP) | ......................... 430/270.16 |
| 9-058123 | * | 3/1997 | (JP) | ......................... 430/270.16 |
| 9-081966 | * | 3/1997 | (JP) | ......................... 430/270.16 |

OTHER PUBLICATIONS

Abstract of JP 09–274732, Oct. 1997.*
Abstract of JP 09–198714, Jul. 1997.*
Abstract of JP 09–081966, Mar. 1997.*
Abstract of JP 10–006644, Jan. 1998.*
Patent Abstracts of Japan, vol. 097, No. 004, Apr. 30, 1997, JP 08 332 772, Dec. 17, 1996.

(List continued on next page.)

Primary Examiner—Martin Angebranndt
(74) Attorney, Agent, or Firm—Oblon, Spivak, McClelland, Maier & Neustadt, P.C.

(57) ABSTRACT

A high-density optical disk comprises a transparent substrate having a guide groove having a depth of 100 to 200 nm, width of 0.2 to 0.4 μm arranged with a track pitch of 0.7 to 1.0 μm. A recording layer is made of an organic pigment exhibiting a specific main weight reduction in a thermogravimetric analysis and a specific exothermic peak in a differential thermal analysis.

11 Claims, 19 Drawing Sheets

OTHER PUBLICATIONS

Patent Abstracts of Japan, vol. 097, No. 004, Apr. 30, 1997, JP 08 339 573, Dec. 24, 1996.
Patent Abstracts of Japan, vol. 098, No. 002, Jan. 30, 1998, JP 09 274 732, Oct. 21, 1997.
Derwent Abstracts, AN 97–531 756, JP 09–254 543, Sep. 30, 1997.
Derwent Abstracts, AN 97–430 665, JP 09–193 545, Jul. 29, 1997.
Derwent Abstracts, AN 97–208 265, JP 09 058 123, Mar. 4, 1997.
Derwent Abstracts, AN 98–125 273, JP 10 006 644, Jan. 13, 1998.

* cited by examiner $W_0$ = GROOVE WIDTH IN UNRECORDED SECTION $W_1$ = GROOVE WIDTH IN RECORDED SECTION $T_1$: STARTING TEMP.

$m_1 - m_2$: TOTAL WEIGHT REDUCTION

REDUCTION RATE = $(m_1 - m_2)/(T_2 - T_1)$ % / °C

OPTICAL RECORDING DISK

BACKGROUND OF THE INVENTION (a) Field of the Invention

The present invention relates to an optical recording disk and, more particularly, to an optical recording disk for recording data thereon using a laser radiation.

(b) Description of the Related Art

Recently, there is a strong demand for an optical recording medium which is capable of recording/reproducing data thereon by using a laser radiation of a smaller wavelength, which is smaller than a current 780 nm or 830 nm wavelength, for a high-density recording. Among other optical recording media capable of smaller wavelength recording, an optical recording disk using an organic pigment has advantages of its low costs and easy processing thereto.

Cyanine or similar substance is recently proposed as an organic pigment for such a smaller wavelength recording in JP-A-6(1994)-3306086, JP-A-7(1995)-161068, JP-A-7(1995)-262604, JP-A-7(1995)-125441, JP-A-7(1995)-266705 etc. In the recording disk using such a substance, it is generally considered that changes in the optical constants and reduction of film thickness due to a thermal decomposition (or pyrolysis) of the organic pigment, as well as transformation or deformation of the substrate due to melting of the substrate, are generated in the recorded section of the disk, as in the case of 780 nm wavelength recording in a CD-R disk.

In such a recording disk, wherein the modulation factor during the recording is obtained by both or either of the decomposition of the pigment and the deformation of the substrate, cross-talk is a major problem since the transformation in the recorded section is large, and it is especially serious if a large bit extends toward the land area from the adjacent groove area in the case of groove recording.

In the case of a smaller track pitch to be applied to a digital audio disk (DVD), the cross-talk problem is more serious. In the above-mentioned patent publications and other publications such as JP-A-4(1982)-109441, JP-A-4(1992)-1182944, JP-A-6(1994)-282873 and JP-A-6(1994)-28287, although CD-R disk having a high reflectance and excellent characteristics are described, the problems and solutions thereof inherently involved in the organic pigment used in the high-density recording medium are not taught nor suggested.

To solve the above problems, the present inventors showed in Japanese Patent Application No. 7(1995)-213501 that small area of the chemical changes in the recorded section, sufficient modulation factor, high reflectance and large signal amplitude can be obtained by employment of the pigments having a characteristic of steep and large reduction in weight as a principal ingredient or an additive of the recording materials, together with the skeletons which have such a characteristic.

However, the present inventors found that the cross-talk problem arises again in the case of a smaller track pitch and a smaller groove width, such as in a recording disk having a high recording capacity of 5 giga-byte (Gbyte) or more recorded on a single surface.

SUMMARY OF THE INVENTION

It is therefore and object of the present invention to provide a high density recording disk having an organic pigment for a recording film.

The present invention provides an optical disk for use at a recording/reproducing wavelength of 500 nm to 700 nm, the optical disk comprising: a transparent substrate having a guide groove having groove depth between 100 nm and 200 nm, groove width between 0.2 $\mu$m and 0.4 $\mu$m and arranged with a pitch between 0.7 $\mu$m and 1.0 $\mu$m, for defining a groove area and a land area; and a recording film, a metallic reflective film and a protective film consecutively formed on the transparent substrate, the recording film containing an organic pigment, the disk having a property satisfying either one of the following requirements in each of the first through fourth aspect of the present invention.

(1) First Aspect:

A film thickness of the recording film at the groove area corresponds to a first interference mound of a disk reflectance, the recording film has a distinction coefficient between 0.03 and 0.09, and an absorbance A1 of the recording layer at a recording/reproducing wavelength and an absorbance A0 of a maximum absorbance or absorbance step most adjacent to the A1 are such that a ratio of A1/A0 resides between 0.07 and 0.18 and A0 resides in a range between 0.5 and 0.7.

(2) Second Aspect:

The recording film exhibits, in a thermogravimetric analysis, substantially no weight reduction at a temperature below a starting temperature of a main weight reduction, a reduction rate of 2% or more in the main weight reduction, and a total weight reduction of 30% or more, and exhibits, in a differential thermal analysis, an exothermic calorie peak between $-10\,\mu$V/mg and $+10\,\mu$V/mg and a peak width of 20° C. or less at exothermic calorie peak.

(3) Third Aspect:

The recording film exhibits, in a thermogravimetric analysis, substantially no weight reduction at a temperature below a starting temperature of a main weight reduction, a reduction rate of 2% or more in the main weight reduction, and a total weight reduction of 30% or more, and exhibits, in a differential thermal analysis, an exothermic calorie peak between 10 $\mu$V/mg and 30 $\mu$V/mg, the metallic film has an inverse of the specific electric resistance at a room temperature between 0.20/$\mu\Omega$·cm and 0.30/$\mu\Omega$·cm, a refractive index of 0.2 or less and an extinction coefficient between 3 and 5.

(4) Fourth Aspect:

The optical disk exhibits a distorted angle $\theta$ of 15° or less in the reproduced signal reproduced at a linear speed of 4.9 m/s or above from a 10T or larger mark recorded at a linear speed of 4.9 m/s or above.

According to the present invention, a smaller cross-talk and a smaller mark length can be obtained for a smaller track pitch and a smaller groove width of a disk, wherein a high-density recording can be realized by a smaller wavelength and a high reflectance.

The above and other objects, features and advantages of the present invention will be more apparent from the following description, referring to the accompanying drawings.

BRIEF DESCRIPTION OF THE DRAWINGS

FIGS. 1 to 5 are graphs each showing calculated results of relationship between recording film thickness or $n_{abs} \cdot d_{groove}/\lambda$ and a disk reflectance;

PREFERRED EMBODIMENTS OF THE INVENTION

Figure 1:
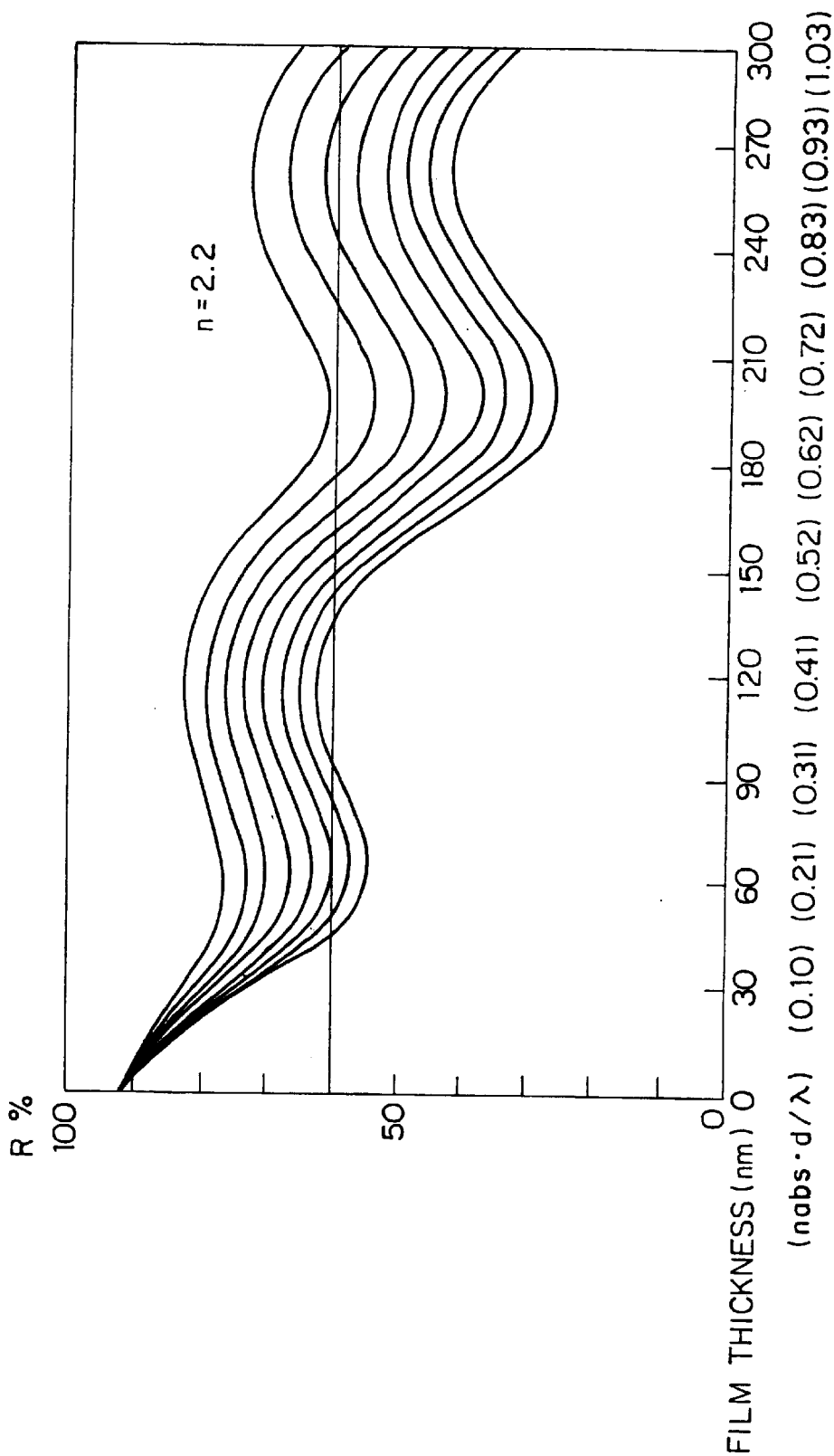
FIG. 1

In the description to follow, the recorded section of a recording film is referred to as the region in which the recording film is reduced in its weight and thickness by a temperature rise due to absorption of the recording laser light to thereby change its optical characteristics including reflectance, which causes change in the phase of the reflected light.

In the present invention, glass or resin known in the art such as polycarbonate, polymethacrylates and amorphous polyolefine is used as a transparent substrate, which has a thickness of 0.6±0.03 mm, on which a guide groove or grooves are formed for a tracking servo technique.

The guide groove preferably has a depth between 100 nm and 200 nm, more preferably larger than 140 nm at its lower limit and smaller than 180 nm at its higher limit, a groove width between 0.2 μm and 0.4 μm, and a track pitch between 0.7 μm and 1 μm. The guide groove preferably has a U-shape. An enough change cannot be obtained during a recording operation in the case of groove depth less than 100 nm, which may result in an insufficient modulation factor. On the other hand, in the case of groove depth more than 200 nm, the reflectance of the guide groove is insufficient due to the large difference in reflectance between the land area and the groove area for the case of groove recording. A sufficient amplitude for a tracking error signal cannot be obtained in the case of groove width less than 0.2 μm, and moreover, a transcription efficiency of the groove geometry is not obtained from the stamper to the disks.

A larger groove width exceeding 0.4 μm is not preferable because of a transverse extension of the recorded section. A smaller groove width is preferable for obtaining a higher modulation factor, although it generates larger cross-talk, as described before. The present invention is especially useful in the case of a relatively small groove width, which may be in the range between 0.2μ and 0.3μ, used for a groove recording. The track pitch is preferably in the range between 0.7 μm and 1 μm in the case of high recording capacity. The groove geometry is generally obtained by an optical measurement using He-Cd laser in the case of more than 1 μm track pitch, and obtained by measuring the profile using STM and AFM methods in the case of less than 1 μm track pitch. In the present invention, the STM and AFM methods are used for measuring the groove geometry.

The recording film is generally fabricated by spin-coating of the solution wherein an organic pigment etc. is solved in a solvent such as ethanol, 3-hydroxy-3-methyl-2-buthanone, diacetone alcohol, and fluorine based alcohol. The solvent is preferably selected from a fluorine based alcohols having a boiling point between 100° C. and 150° C., and having three or more of carbons, e.g., 1H, 1H, 3H-tetrafluoro propanol, 1H, 1H, 5H-octafluoropentanol, and 1H, 1H, 3H-hexafluorobutanol. If the boiling point is below 100° C., since the solvent evaporates faster during the spin-coating, the coating liquid does not spread toward the outer disk area, outside the radius of 40 nm for example, which results in a larger film thickness in the vicinity of the disk center to retard the disk characteristics. If the boiling point is above 150° C., the solvent less evaporates to result in a larger evaporation time or larger content of the solvent remaining in the recording film, which may generate a higher jitter and undesirable.

A preferable film thickness of the recording film is in the range between about 50 nm and about 100 nm at the inter-groove area or land area, and 90 nm and 180 nm at the groove area. A smaller film thickness below the mentioned value at the groove area or land area may result in an insufficient modulation factor, whereas a larger film thickness above the mentioned value may result in an extension of the recorded section in the directions of the track and land, which causes higher jitter and larger cross-talk. It is difficult in fact to accurately detect the film thickness both at the groove area and the land area, and the practical film thickness is often represented by the film thickness at the land area (see JP-A-4(1992)-109441, JP-A-4(1992)-182944, for example). The ratio of the film thickness at the groove area to the film thickness at the land area depends on the spin-coat conditions such as the solvent of the coat liquid, disk rotation during the spin-coating, air velocity, temperature, and the density and viscosity of the solution, and the depth and width of the groove. Accordingly, it is difficult to detect the film thickness at the groove area solely from the average film thickness or the film thickness at the land area and the groove depth at the coated film measured after the spin-coating. On the other hand, if the ratio of the groove depth after the spin-coating (or at the coated film) to the groove depth before the spin-coating (or at the substrate), the film thickness at the land area and the groove depth at the substrate can be detected, the film thickness at the groove area can be obtained accordingly.

It is preferable that ratio of the groove depth at the coated film to the groove depth at the substrate is between 50% and 80%. If ratio is less than the mentioned value, which means that the thickness of the coated film is too large, a sufficient high reflectance may not be obtained, which in turn results in a lower amplitude of the tracking error signal. On the other hand, if the ratio is above the mentioned value, which means that the thickness of the coated film is too small, a sufficient modulation factor may not be obtained. The ratio of the groove depth at the coated film to the groove depth at the substrate can be obtained from the measurements of both the depths by using an AFM (Or STM) technique, with the conditions of both the measurements being maintained same. The film thickness at the land area can be measured by measuring the three-dimensional surface roughness meter at the starting position of the coating after forming a reflecting layer on the coated film.

The film thickness at the groove area in the first aspect of the present invention is shown in FIG. 1, wherein the film thickness covers a first mound region of the optical interference (first interference mound). The first interference mound can be calculated as in FIG. 1 as well as in FIGS. 2 to 5. The calculation is based on a reflectance calculation of a general optical multilayer structure having a substrate/recording film/reflective films. The amount of the reflected light is calculated in terms of percentage of the amount of the incident light having a 640 nm wavelength and incident through the substrate, wherein it is assumed that the substrate has a mirror surface without the groove. The reflectance on the groove is as low as on the order of 90% of the reflectance in the case of a mirror surface, depending greatly on the geometry of the substrate such as track pitch. Accordingly, the range of reflectance above 60% in the calculated result, which can satisfy above 55% in the case of actual reproducing of groove data, i.e., data recorded on the groove, is assumed as the range of the mound of the optical interference.

The refractive index "n" of the recording film to be employed in each embodiment of the present invention is preferably in the range between 2.2 and 2.8, and more preferably in the range between 2.4 and 2.8. The extinction coefficient "k" to be employed in each embodiment is preferably in the range between 0.03 and 0.09, and more preferably between 0.03 and 0.07 except for the case of higher recording speed more than 4.9 m/s. In such a case, "k" is preferably in the range between 0.03 and 0.1. In the calculation, the wavelength, refractive index "n" and distinction coefficient "k" of the reflecting layer and "n" and "k" of the substrate are assumed at 640 nm, 0.168, 3.15, 1.58 and 0, respectively.

The "n" and "k" of the pigment as used in the present invention can be measured by the following methods. A liquid pigment is placed on a replica having a mirror surface for covering an about half the replica area, spin-coated thereon to form a recording film, followed by forming a reflective film on a region of the recording film by sputtering. The step difference between the surfaces of the recording film and the reflective film is measured by a three-dimensional surface roughness meter (ZYGO:Maxim 5800 from Cannon Corp.) to obtain the film thickness of the reflective film. Then, a multiple incident angle is measured on the exposed recording film by using an automated wavelength scanning elipsometer (MEL-30S from NIHON BUNKO CO.), and the solutions are obtained as "n" and "k".

The film thickness of the reflective film thus obtained was 100 nm, which was the result after the film thickness of the recording film was changed between 0 nm and 300 nm. In the drawings, the scale on the abscissa is 30 nm. The value of $n_{abs} \cdot d/\lambda$, which is described layer, is also shown as the scale on the abscissa. In FIGS. 1 to 5, the illustrated curves thus calculated are shown for the extinction coefficient between 0.03 and 0.1, with the scale of the extinction coefficient at 0.01. The curves of the reflectance (%) plotted against the film thickness comprises two interference mounds, wherein the same value for "n" provides a maximum at the same film thickness, and wherein the maximum value of the reflectance reduces as the "k" increases. If a reflectance equal to or above 60% is obtained in the calculation, it is considered an excellent disk reflectance can be actually obtained on the groove area. By examination of "k" and the film thickness, it is understood that at least three regions of the film thickness including 0–60 nm, 60–180 nm and 180–300 nm regions satisfy the above requirements. However, the central region, or first interference mound only can satisfy the above requirements in view of the recording characteristics. A disk fabricated based on the film thickness of 0–60 nm at the groove area may not provide a sufficient recording contrast due to the small thickness, which also causes a larger heat dissipation from the metallic reflective film to thereby enlarge the mark length in the recorded section and degrade the recording sensitivity. On the other hand, a disk fabricated based on the film thickness of 180–300 nm, or the second interference mound, tends to increase the temperature rise in the recorded section due to the large film thickness, thereby forming a recorded mark having a larger length and a larger width, which causes difficulty in selection of the pigment. Accordingly, it is not suited to a high-density recording disk such as DVD, wherein data is recorded based on the mark length on the groove having small width and depth, with a track pitch of less than 1.0 μm, and recorded mark has a minimum length of about 0.4 μm. In a conventional CD-R disk having an organic substance and having a high reflectance, the film thickness at the groove area is based on the second interference mound. The recording disk of the present invention has a recording film of a far smaller thickness than the CD-R disk, and this is one of the important features requested to the DVD.

In the present invention, the film thickness at the land area can be obtained by measurement using a three-dimensional surface roughness meter or observation using a scanning electron meter (SEM) after emission by electron beam for exposure of the pigment film. With reference to parameters used in JP-A-4(1992)-182944, the parameters in the recording film of the present inventions are expressed as follows:

$$d_{groove} = d_{sub} - d_{film} + d_{land},$$

wherein $d_{groove}$, $d_{sub}$ and $d_{land}$ represent the film thickness at the groove area, groove depth at the substrate and the film thickness at the land area, respectively, and $d_{film}$ is the groove depth at the recording film.

Assuming that $\lambda$ and $n_{abs}$ are the wavelength of the reproducing light and refractive index of the recording film, respectively, it is preferable that $n_{abs} \cdot d_{groove}/\lambda$ is in a range between 0.20 and 0.65, $d_{groove} > d_{land}$, and the extinction coefficient "k" is in a range 0.03 and 0.09. If $n_{abs} \cdot d_{groove}/\lambda$ is smaller than 0.20, the film thickness of the recording film is too small to obtain a sufficient temperature rise and it is difficult to obtain a modulation factor of 50% or more. On the other hand, if $n_{abs} \cdot d_{groove}/\lambda$ is above 0.65, the film thickness is too large, and an excess temperature rise takes place in the vicinity of the recorded section, which causes a larger recorded mark and a larger cross-talk. An extinction coefficient "k" smaller than 0.03 causes a smaller optical absorption of the recording film to degrade the optical sensitivity thereof, although a sufficient high reflectance can be obtained. On the other hand, an extinction coefficient "k" larger than 0.09 does not provide a stable and high reflectance because of the smaller margin of the film thickness, and may not provide a reflectance of 45% or more on the groove area (or reflectance of 60% or more on the land area)

In JP-A-4(1992)-182944, $\rho = n_{abs} \cdot d_{av}/\lambda$ is introduced wherein $\rho$ is in a range between 0.05 and 1.6. In this publication, $d_{av}$ is an average film thickness in the disk, whereas $d_{groove}$ as used for the expression $n_{abs} \cdot d_{groove}/\lambda$ in the present invention is the film thickness at the groove, which means that $n_{abs} \cdot d_{groove}/\lambda$ is far smaller than $\rho$ in the publication because $d_{groove}$ is far greater than $d_{av}$. This is understood from the range of ΔC used in the publication and expressed as follow:

$$\Delta C = (d_{groove} - d_{land}) \cdot n_{abs}/\lambda.$$

In JP-A-4-182944, the range for ΔC is between 0.12 and 0.75, whereas in the present invention, preferable range for ΔC is between 0.09 and 0.40. ΔC smaller than 0.09, which means a smaller thickness of the recording film, may not provide a sufficient recording sensitivity and a sufficient modulation factor. ΔC larger than 0.40, which means a larger thickness of the recording film, enlarges a recorded mark in both the directions of track and radius in the recorded section, which causes larger jitter and larger cross-talk. A preferable range for $n_{abs}$ is between 2.2 and 2.6 especially in the first aspect of the present invention. It is difficult to obtain a sufficient refractive index contrast for $n_{abs}$ below 2.2. A single pigment film which satisfies this range of $n_{abs}$ exhibits a maximum absorbance or step absorbance in a wavelength most adjacent to the recording/reproducing wavelength which is shorter than the recording/reproducing wavelength by 40 to 60 nm.

Figure 6:
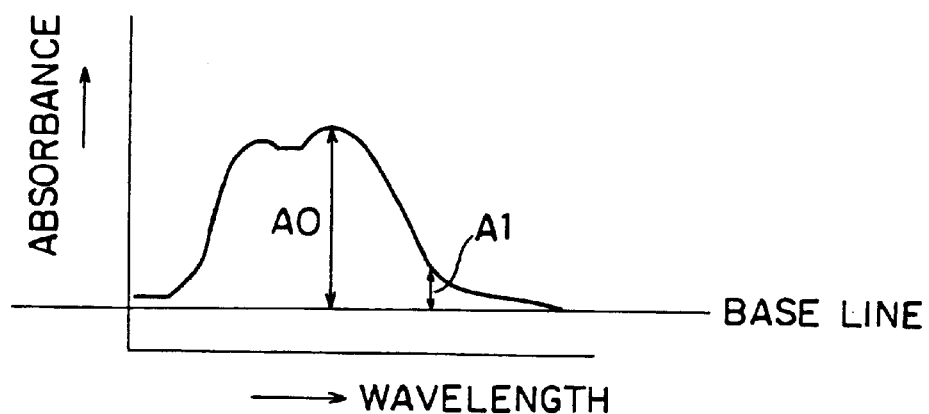
FIG. 6 is a graph showing a base line absorbance.

To be practical, it is preferable that the single recording film exhibits an absorption spectrum, wherein A1/A0 is between 0.07 and 0.18 in the relationship between the optical absorbance A1 at the wavelength which is in the range of ±3 nm from the recording/reproducing wavelength and an adjacent maximum absorbance or step absorbance A0 which is between 0.5 and 0.7. The ratio A1/A0 below 0.07 does not provide a sufficient absorption, which causes insufficient recording sensitivity, whereas the ratio exceeding 0.18 does not provide a sufficient reflectance due to an excess absorption and a stable tracking operation due to a small tracking error signal. A0 less than 0.5 does not provide a sufficient film thickness, whereas A0 exceeding 0.7 increases jitter due to a larger thickness. In the measurement of the optical absorbance, a substrate having a wide groove and a track pitch of 1.6 μm is preferably used because of less influence from groove geometry by scattering etc. Alternatively, a substrate having a groove of 1.6 μm wide or less may be used in the measurement wherein light is incident through the substrate from which the reflective film is removed or on which a single recording film is formed at the surface having the groove thereon. The optical interference by the guide groove may occasionally provide a weak absorption band which does not generally appear in the absorption spectrum of the recording film formed on a mirror substrate. In this occasion, the weak absorption band should not be included in the absorbance as mentioned above. Moreover, it is not requested to provide a reference substrate or blank substrate having a similar geometry. In this case, a base line absorbance is measured for a longer wavelength wherein optical absorption by the film does not occur, and the absorbances A1 and A0 are obtained by subtracting the base line absorbance from the measured absorbances. The base line absorbance is shown in FIG. 6. In the measurements, a spectrophotometer (UV-3100S from Shimazu Seisakusho Corp.) was used in the present invention.

Figure 7:
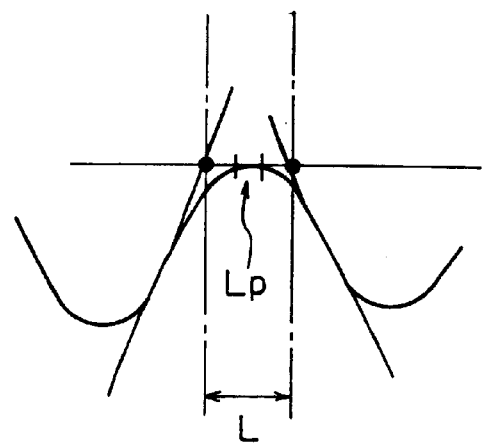
FIG. 7 is graph showing relationship between width (Lp) of the land area and the width (L) of the corresponding land area defined groove walls.

It is preferable that the width (Lp) of the land area between groove areas is between 45% and 95% of the width (L) of the outer land area defined by tangents of the groove walls and the horizontal plane, as shown in FIG. 7. A groove width Lp outside the specified range may cause difficulty in adjustment of the film thickness during the spin-coating for the recording film.

Figure 8:
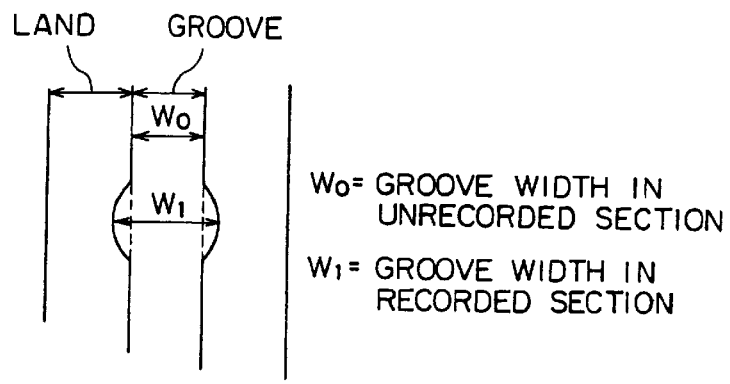
FIG. 8 is an explanatory diagram showing the groove width in the unrecorded section and the recorded section.

The thermal characteristics of an organic pigment which is used for the recording film have a large influence on the recording property. Examples for the organic pigments so far proposed for the recording film include phthalocyanine-based pigment, cyanine pigment, metal-containing azo pigment, dibenzofuranon based pigment, and metal-containing indo-aniline. The reduction in weight in the thermogravimetric analysis by a main weight reduction process should be sharp against a temperature change in order to obtain sufficient recording characteristics for a small wavelength light. This is because the organic pigment film exhibits a reduction of the film thickness and changes in the optical constants thereof due to the decomposition during the reaction of the main weight reduction process. As a result of these reduction and change, an optical bit (or recorded section) is formed therein. As described before, the refractive index of the pigment for the reproducing wavelength should be in the range between 2.2 and 2.8, preferably between 2.4 and 2.8, the extinction coefficient "k" should be in the range between 0.03 and 0.09, preferably between 0.03 and 0.07 except for the case of higher recording speed more than 4.9 m/s. By these configurations, a high reflectance can be obtained, which provides a large reflectance contrast before and after the recording. Moreover, in many cases, the substrate region underlying the recorded bit is subjected to a transformation by the temperature rise due to the heat absorption by the pigment film during the recording, which enlarge the groove width, as shown in FIG. 8. In the present invention, the size of the transformation (or groove width W1 of the recorded section) should be in the range between 1.0 and 1.5 of the groove width W0 of the unrecorded section, that is, the ratio W1/W0 should be in the range between 1 and 1.5. If the ratio exceeds 1.5, large cross-talk and jitter will result for the track pitch equal to or below 0.8 μm, which is undesirable.

On the other hand, if the main weight reduction is moderate against the temperature change, or the main weight reduction occurs in a wide temperature range, changes in the optical characteristics and film thickness in the recording film take place in a larger area after the pigment constituting the recording film absorbs light to form a bit. In this case, for a high-density recording based on a mark length method, the recorded bits are overlapped with each other. That is, the moderate change degrades the resolution and increases the jitter, which are undesirable. Therefore, the pigment which exhibits a steep weight reduction against the temperature change is desired.

In the present invention, a pigment having a two-step weight reduction property, wherein an additional weight reduction appears below at a temperature below the starting temperature of the main weight reduction, is not desirable either. In the second and third aspects of the present invention, the gradient of the weight reduction against a temperature change, or weight reduction rate, in the main weight reduction process should be 2%/° C. or more, and more preferably 10%/° C. or more, and the total weight reduction should be 30% or more of the total initial weight, and more preferably 35% or more. A smaller weight reduction rate below the specified value may not provide a sufficient small size of the recorded mark which does not extends toward the land to increase the jitter and degrade the resolution, which are undesirable for a small mark length recording corresponding to a high-density recording. A smaller total reduction rate below 30% may not provide a sufficient reflectance contrast before and after the recording as well as a sufficient modulation factor, which does not provide a sufficient small bit.

For obtaining small cross-talk in a smaller track pitch scheme, the exothermic calorie peak (exothermic peak) in the main weight reduction process in the pigment should be between −10 μV/mg and 10 μV/mg, and more preferably between −5 μV/mg and 5 μV/mg. An exothermic peak exceeding the specified upper value increases the cross-talk up to above 50% for a groove width of below 0.3 μm. On the other hand, an exothermic peak below the specified lower limit degrades the recording sensitivity due to the large thermal absorption. The peak width for the exothermic peak or endothermic peak should be below 20° C. A peak width above the specified value does not provide a sufficient steep edge for the recorded mark. The starting temperature of the main weight reduction process should be between 150° C. and 340° C.

Figure 9:
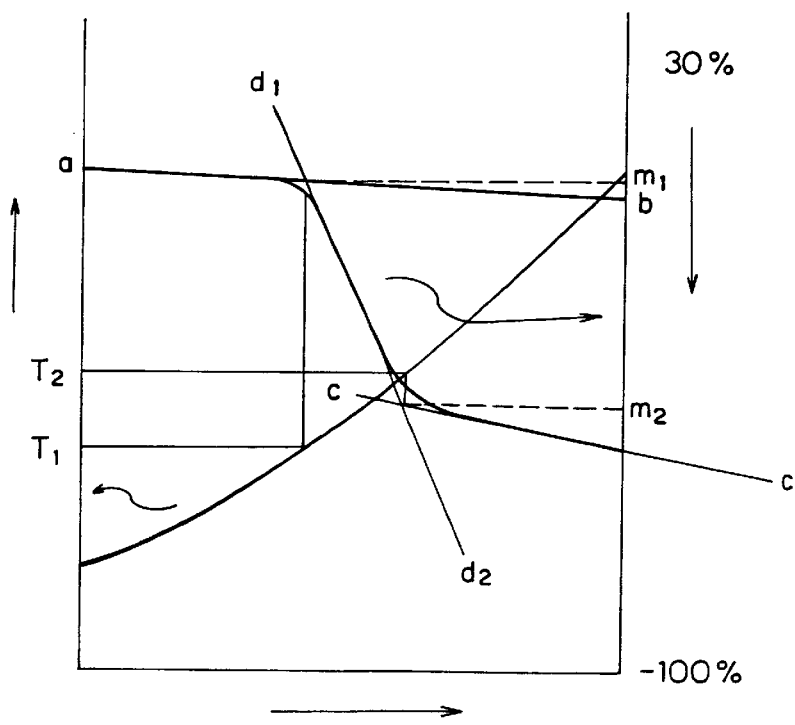
FIG. 9 is graph showing a main weight reduction process, total weight reduction and reduction rate of a pigment measured in a differential thermal analysis.

In the present invention, the weight reduction rate is obtained as follows. An optical pigment having a mass of M0 is heated in a nitrogen ambient at a rate of 10° C./minute (see FIG. 9). As the temperature rises, the mass is reduced at a small rate in the initial period to trace a first substantially straight line a–b, then, reduced at a larger rate of more than 15% to trace a second substantially straight line d1–d2, which is called herein a main weight reduction. The starting temperature of the main weight reduction is designated by T1. The weight reduction is then slowed down to trace a third substantially straight line c—c. The weight reduction rate is expressed as follows:

(m1−m2)(%)/(T2−T1)(° C.), wherein T2 and m2 are the temperature and the mass at the intersection of the straight line d1–d2 and the straight line c—c, respectively, and m1 is the initial mass. The total weight reduction is expressed as (m1−m2) (%).

Figure 10:
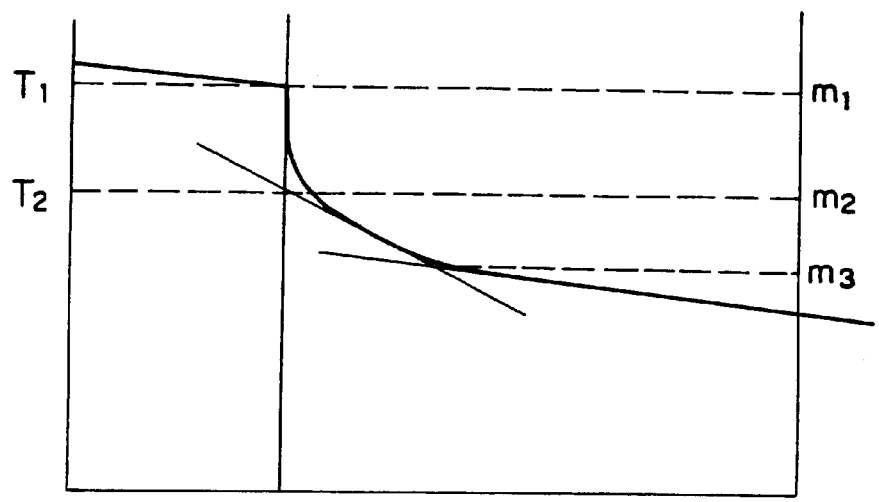
FIG. 10 is another graph similar to FIG. 9.

In FIG. 10, the weight reduction rate and the total weight reduction are expressed similarly as follows:

(m1−m2)(%)/(T2−T1), and (m1−m2)(%).

In the present invention, the calorific value can be obtained as follows. A differential temperature analysis (DTA) curve shown in FIG. 10 is first obtained together with the weight reduction curve as mentioned above. A reference and the sample for the pigment are prepared, wherein the reference is an aluminum container which is similar to another aluminum container receiving the sample of powder pigment. Both the reference and sample are heated at a rate of 10° C./minute in a nitrogen ambient flowing at a rate of 200 mL/minute. The aluminum containers had a diameter of 5 mm and a height of 2.5 mm. The amount of the sample powder roughly corresponds to the depth that does not exceed 80% of the height of the container. The data was sampled at every second.

Figure 11:
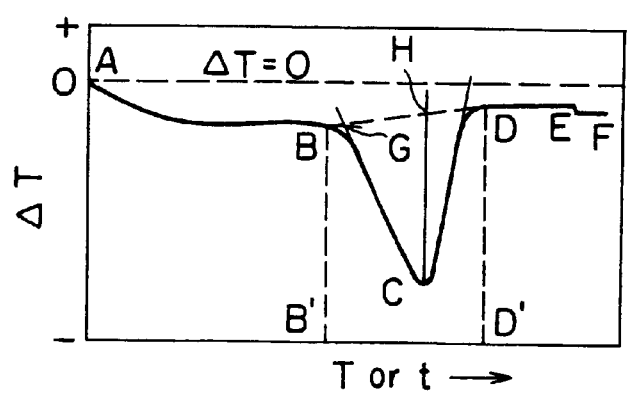
FIG. 11 is a graph showing exothermic (endothermic) calorie peak and peak width in a differential thermal analysis.

FIG. 11 shows the results of the data sampling as described above, wherein exothermic or endothermic peak appears in the DTA at a time in the vicinity of the time instant at which a steep weight reduction occurs in the TG curve. The exothermic (endothermic) peak is designated by CH in FIG. 11, and obtained by dividing the peak value by the weight of the sample, the peak value being measured as the peak temperature difference from the difference between the electromotive forces of the platinum-rhodium thermocouples (platinum:rhodium=87:13) disposed at the centers of the bottoms of the aluminum containers of both the sample and reference. When two of the peak values appeared, the larger peak was selected. The peak width (° C.) was obtained by multiplying the time difference (min.) between the points B' and D' by the rate of temperature rise which was 10° C./min.

Examples of the pigments which satisfy the above-mentioned requirements include:

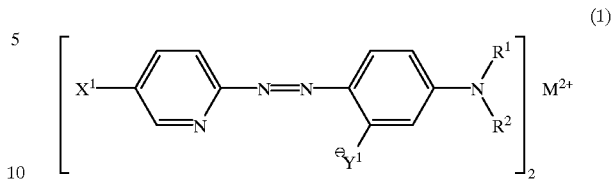

(1)

wherein $X^1$ is a substituent implementing a electron-withdrawing group of the para position distribution, $Y^1$ is a substituent selected from the group consisting of hydroxyl group, carboxyl group and sulfonic acid derivative group, and each of R1 and R2 is an alkyl group, methoxyethyl group, ethoxyethyl having 1 to 6 of carbons, and $M^{2+}$ represents a divalent ion of nickel, cobalt or copper);

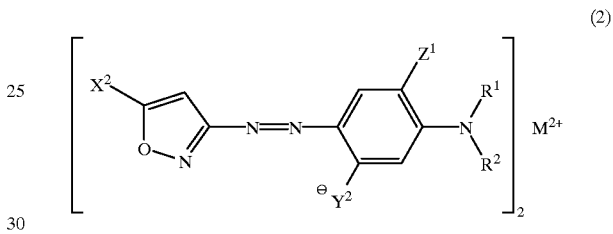

(2)

wherein $X^2$ is an alkyl group having 1 to 7 carbons, cycloalkyl group having 3 to 7 carbons, $SR^3$, $OR^3$ (wherein R3 is an alkyl group having 1 to 7 carbons which may have a substituent or a cycloalkyl group having 3 to 7 carbons which may have a substituent), $Y^2$ is hydroxyl group, carboxyl group, sulfonic acid derivative group or $(NSO_2Y^3)-$, wherein $Y^3$ is an alkyl group having 1 to 6 carbons which may have a substituent, $Z^1$ is a hydrogen atom, halogen atom, or alkoxy group having 1 to 4 carbons, and each of $R^1$, $R^2$ and $M^{2+}$ are same as described above;

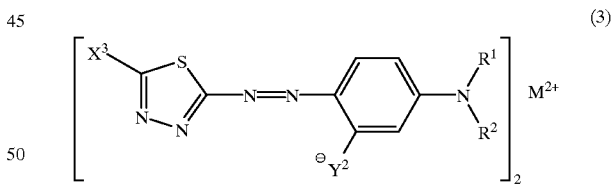

(3)

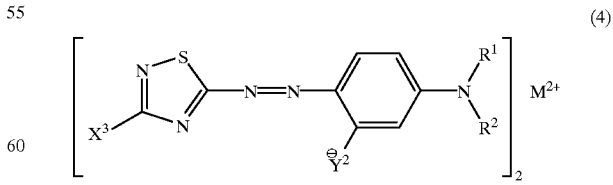

(4)

wherein $X^3$ is a hydrogen atom, an alkyl group having 1 to 7 carbons or a cycloalkyl group having 3 to 7 carbons, and $R^1, R^2$, $Y^2$ and $M^2$ are same as described above; and

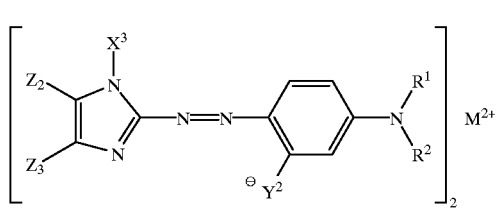

wherein $Z^2$ and $Z^3$ are electron-withdrawing groups, $R^1$, $R^1$, $X^3$, $Y^2$ and $M^{2+}$ are same as described above.

In the above general formulae, examples of the electron-withdrawing group represented by $X^1$ include cyano group, halogen atom, trifluoromethyl group. Examples of the alkyl group include methyl group, ethyl group, n-propyl group, isopropyl group, n-butyl group, sec-butyl group, tert-butyl group, n-heptyl group, n-hexyl group. Examples of the alkyl group having 1 to 6 carbons which may be substituted by the halogen atom represented by $Y^3$ include methyl group, ethyl group, n-propyl group, isopropyl group, n-butyl group, sec-butyl group, tert-butyl group, n-heptyl group, n-hexyl group, chloromethyl group, dichloromethyl group, trichloromethyl group, trifluoromethyl group, bromomethyl group, methyl iodide group, 2,2, and 2-trifluoroethyl group, perfluoroethyl group, and perfluoropropyl group. Examples of the alkyl group having 1 to 7 carbons and represented by $X^3$ or $R^3$ include methyl group, ethyl group, n-propyl group, isopropyl group, n-butyl group, sec-butyl group, tert-butyl group, n-heptyl group, n-hexyl group, and n-heptyl group. Examples of the cycloalkyl group having 3 to 7 carbons and represented by X3 or R3 include cyclopropyl group, cyclobutyl group, cyclopentyl group, cyclohexyl group, cycloheptyl group, and methylcyclohexyl group. Examples of the electron-withdrawing group represented by $Z^2$ and $Z^3$ include cyano group and alkoxycarbonyl group.

As practical examples suitable to the first aspect of the present invention, the following may be exemplified:

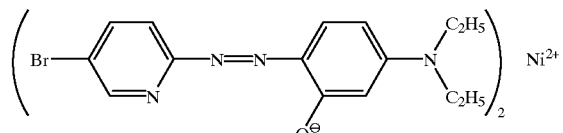
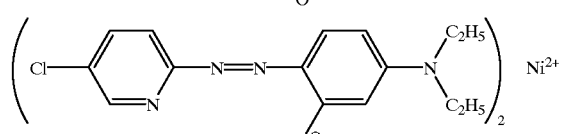
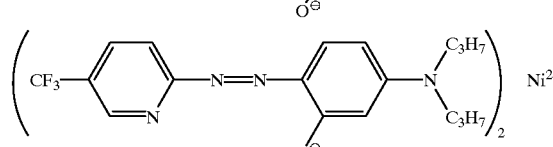
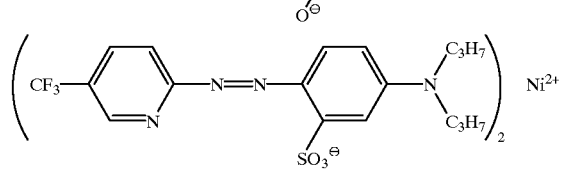
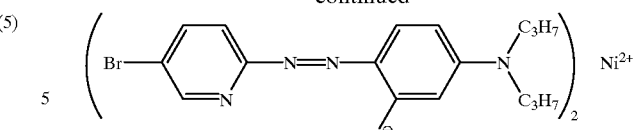
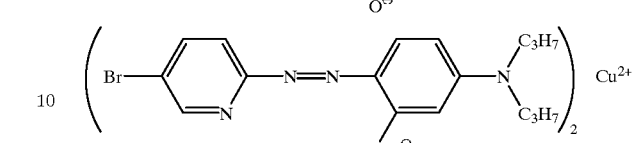
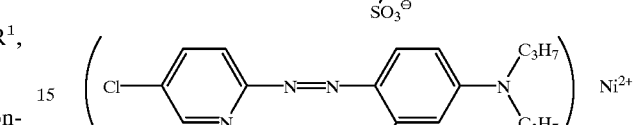
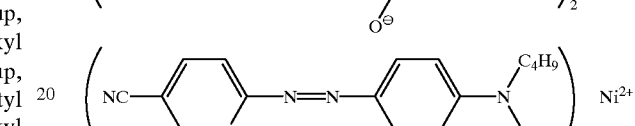
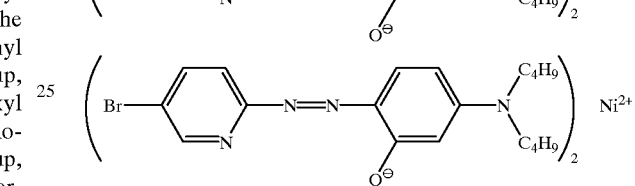
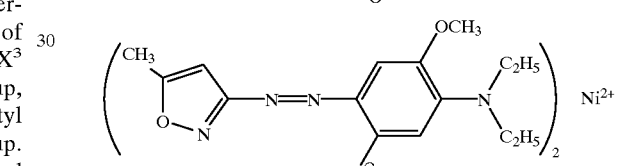
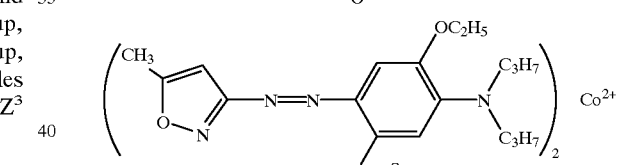
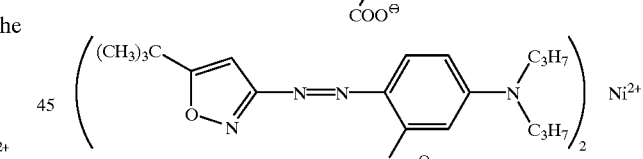
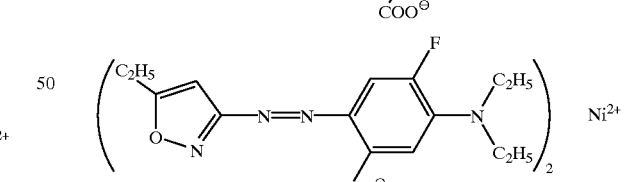
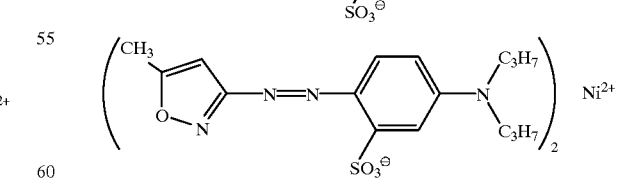
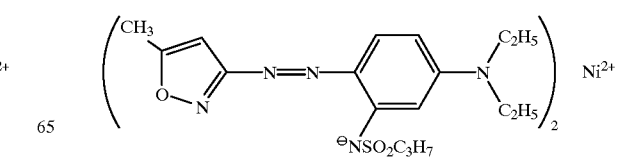

-continued
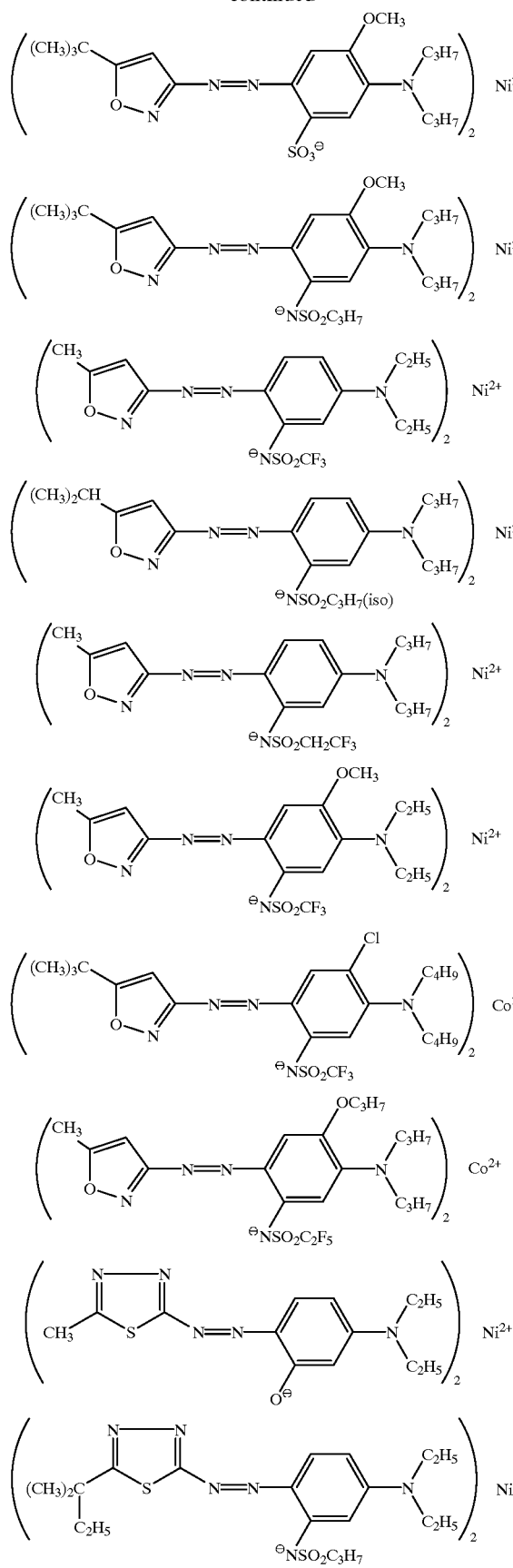
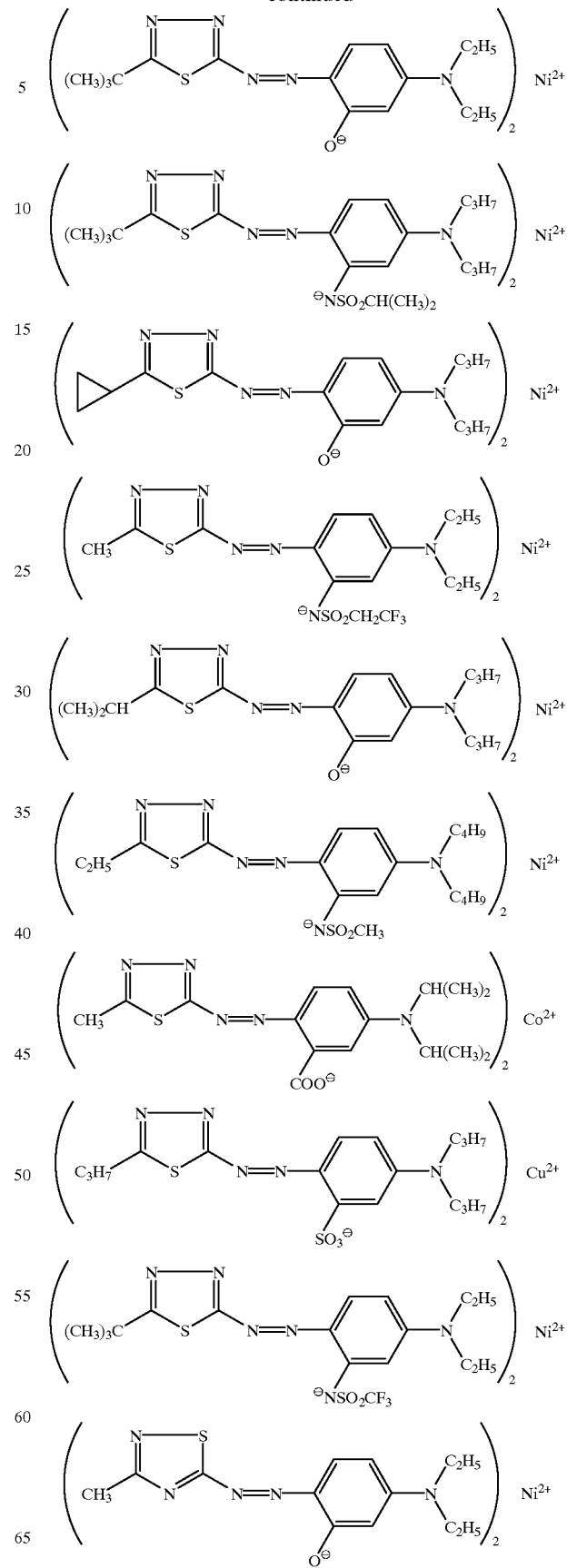

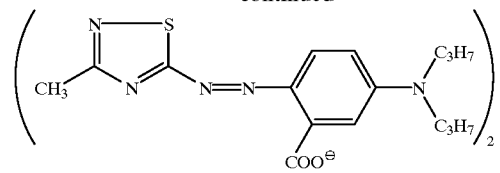
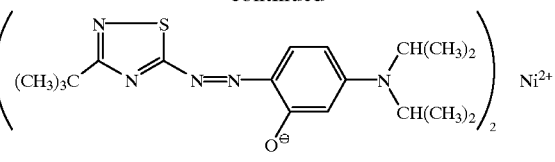
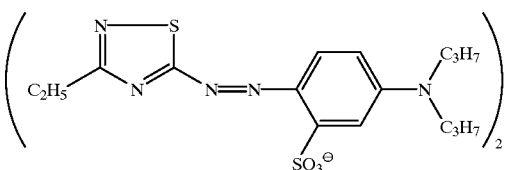
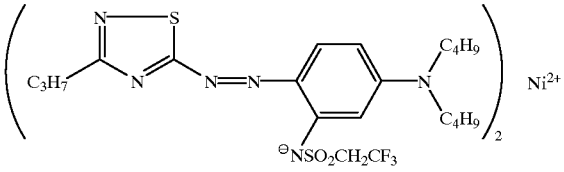
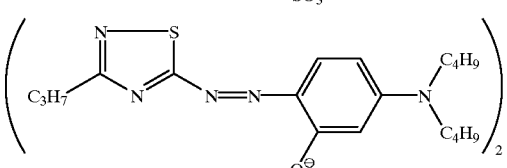
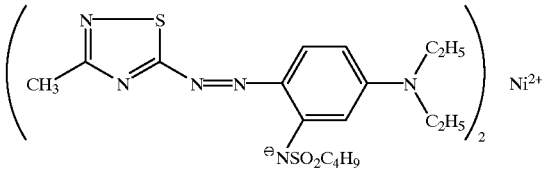
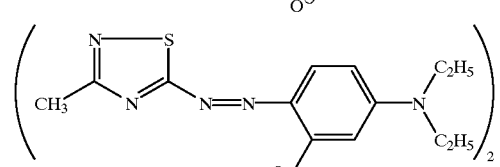
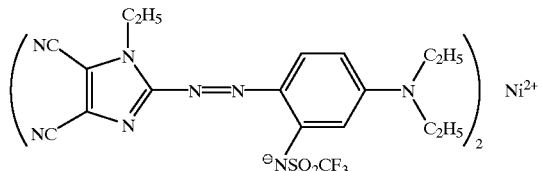
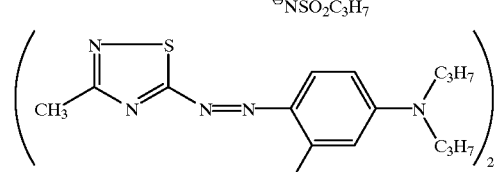
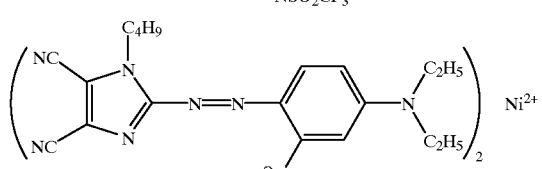
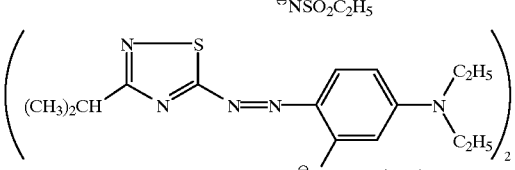
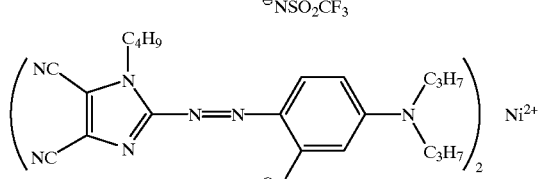
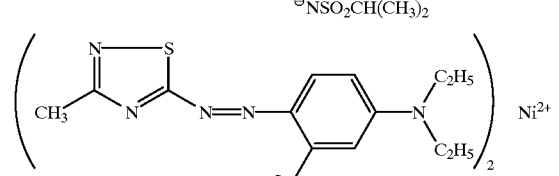
As practical examples suitable to the second and third aspects of the present invention, the following may be exemplified:
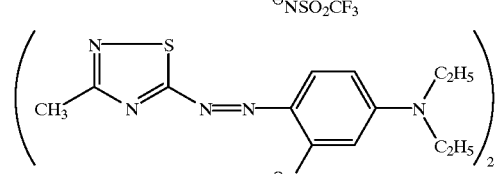
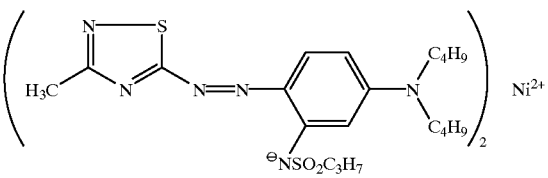
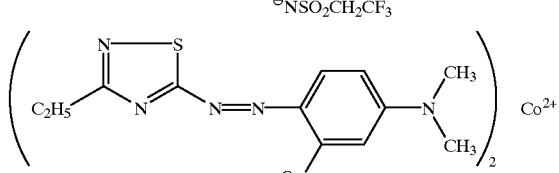
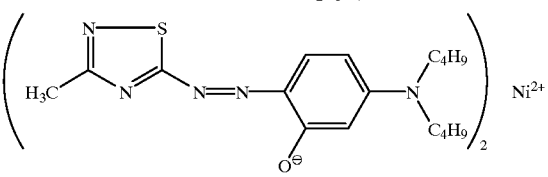
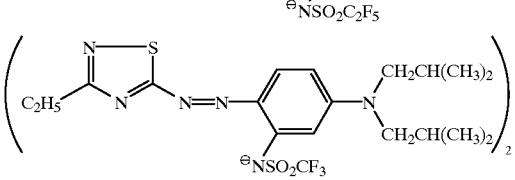
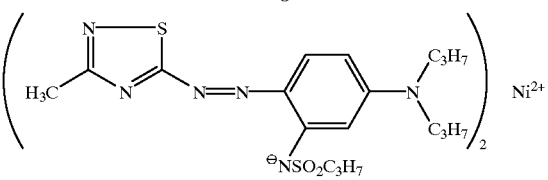

-continued

-continued

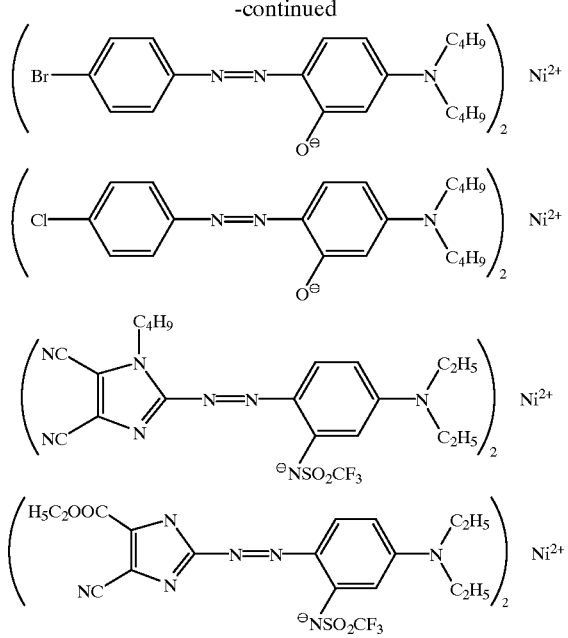

Not all of the organic pigments cited above have excellent characteristics as the recording film having an exothermic calorie less than 10 μV/mg. In this respect, an organic pigment having exothermic calorie between 10 μV/mg and 30 μV/mg may be covered by a metallic reflective film having an inverse of the specific electric resistance thereof at a room temperature between 0.20/μΩ·cm and 0.30/μΩ·cm so that the recording film have an excellent heat dissipation, the reflective film being used in the present invention as a quenching material. Since the electric conductivity and the thermal conductivity are proportional to each other, as shown in Wedeman-Frantz rule, the thermal conductivity of the thin film can be inferred from the electric conductivity thereof.

In the present embodiments, the electric conductivity was determined by measuring, using a four-pole method, a surface resistance R of a metallic film sputtered to a thickness of 100 nm on a slide glass and the inverse of the specific electric resistance was calculated from the surface resistance R by the following formula:

(π/ln(2))·R·t wherein "t" represents the film thickness. The electric conductivity thus obtained is larger than gold, and should be in the range between 0.20/μV·cm and 0.30/μV·cm. The metallic film should have a high reflectance, and the refractive index and extinction coefficient of the metallic film should be in the range between 0.1 and 0.2 and the range between 3 and 5, respectively, at the reproducing wavelength. The practical examples of the materials for the metallic layer include silver and a silver alloy. This combination of the recording film with exothermic range and the metallic reflective film with said thermal conductivity suppresses expansion of the recorded mark toward the adjacent track due to rapid cooling, thereby reducing the cross-talk. In the measurements, the inverses of the specific electric resistances of the gold and silver were 0.15/μΩ·cm and 0.27/μΩ·cm, respectively.

The metallic reflective film should have a high reflectance for the laser light transmitted through a transparent substrate and have a high refractive index "n" and an extinction coefficient "k" between 0.1 and 0.2 and between 4 and 5, respectively, at a recording/reproducing wavelength between 500 nm and 700 nm. Preferable material for the metallic reflective layer is silver or a silver based alloy because, among other metals, silver has a high thermal conductivity, which suppresses the temperature rise by a large quenching effect, suppresses the extension of the transformation of the substrate, and reduces the cross-talk. Moreover, silver has a higher reflectance than gold and aluminum alloys, and provides a high signal amplitude even from a small bit length, thereby exhibiting excellent characteristics especially for the small bit length. To improve resistance upon oxidation of the silver, one or more additive elements such as Ti, Rh, Cu, Ta, Pd, Ni, V, Co, Cr, Si, C, B, Sn, P, Zn, Sb, and Mo may be preferably added in the silver below 10 atomic % of silver. The film thickness of the metallic reflective film is preferably equal to or more than 80 nm, which does not provide an excess suppression of the transformation of the recording film nor degrades recording characteristics thereof.

A protective film is generally laminated on the reflective film for prevention of generation of holes in the metallic reflective film or an asymmetric transformation of the recorded section. An ultraviolet ray cured resin (UV-cured resin) may be preferably used as the material for the protective film. The film thickness is preferably equal to or above 1 μm, and more preferably equal to or above 3 μm, for prevention of suppression of the curing of the UV resin. Above the protective UV-cured resin coat, an adhesive layer such as a hot melted or UV-cured adhesive layer having a thickness of 10 to 20 μm may be formed for sticking two of the disks of the present invention.

Figure 12A:
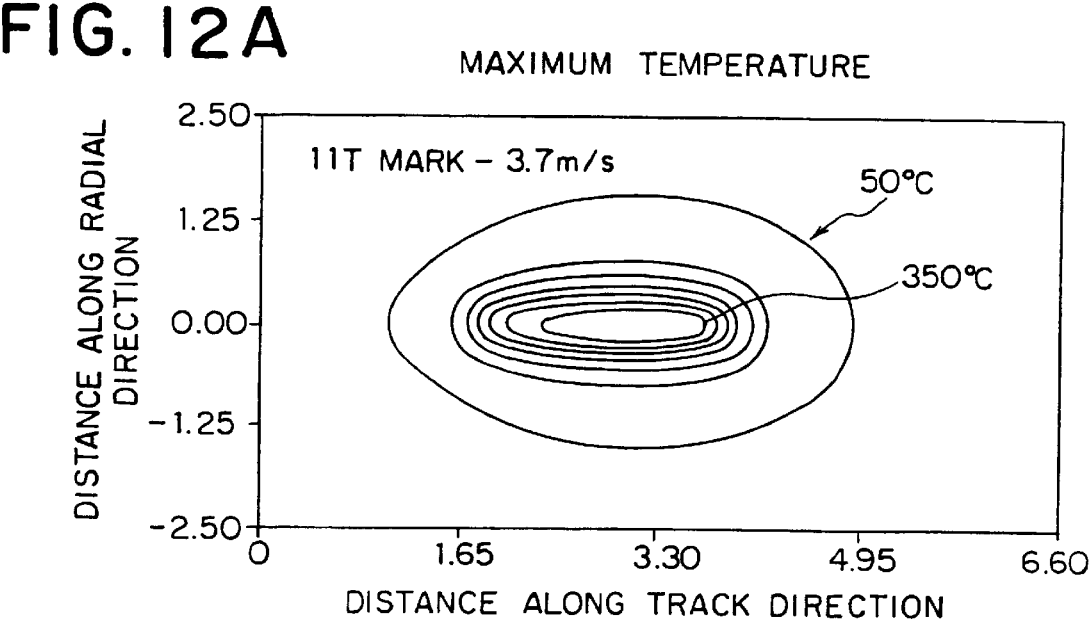
FIGS. 12A and 12B are equi-temperature diagrams (maximum temperature) showing temperature distributions obtained for the disk according to the first embodiment by calculation in the cases of linear speed of 3.7 m/s and 4.9 m/s, respectively, wherein the recording power level is that renders β=0.
Figure 12B:
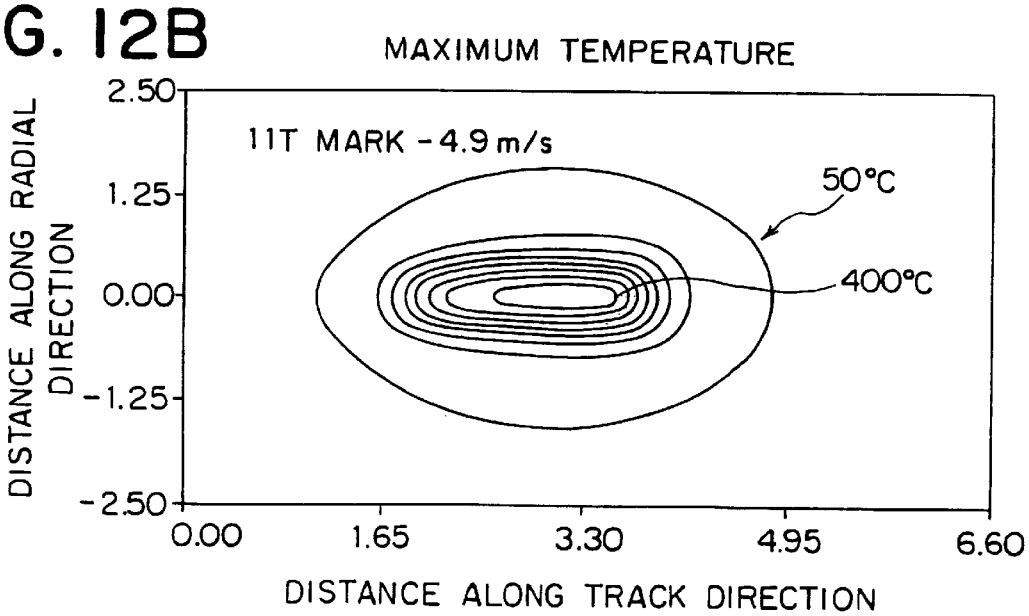
Figure 13A:
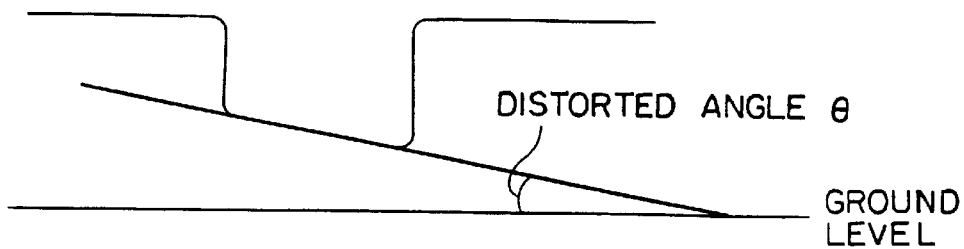
FIGS. 13A is a graph showing a distorted angle θ in a reproduced signal from 10T or 11T mark.
Figure 13B:
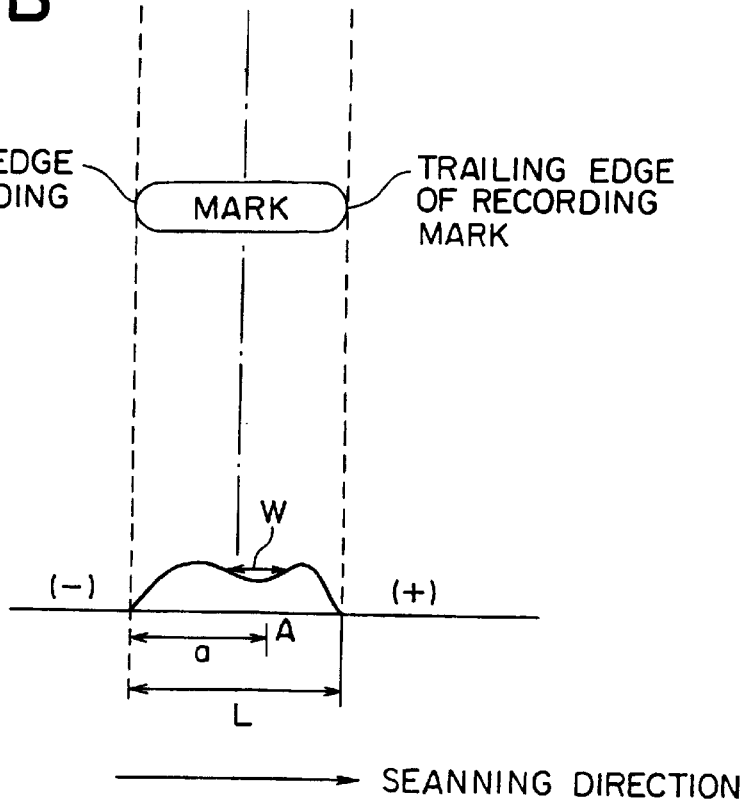
FIG. 13B is a graph showing the location of the peak of the depression and a half-height width.
Figure 14:
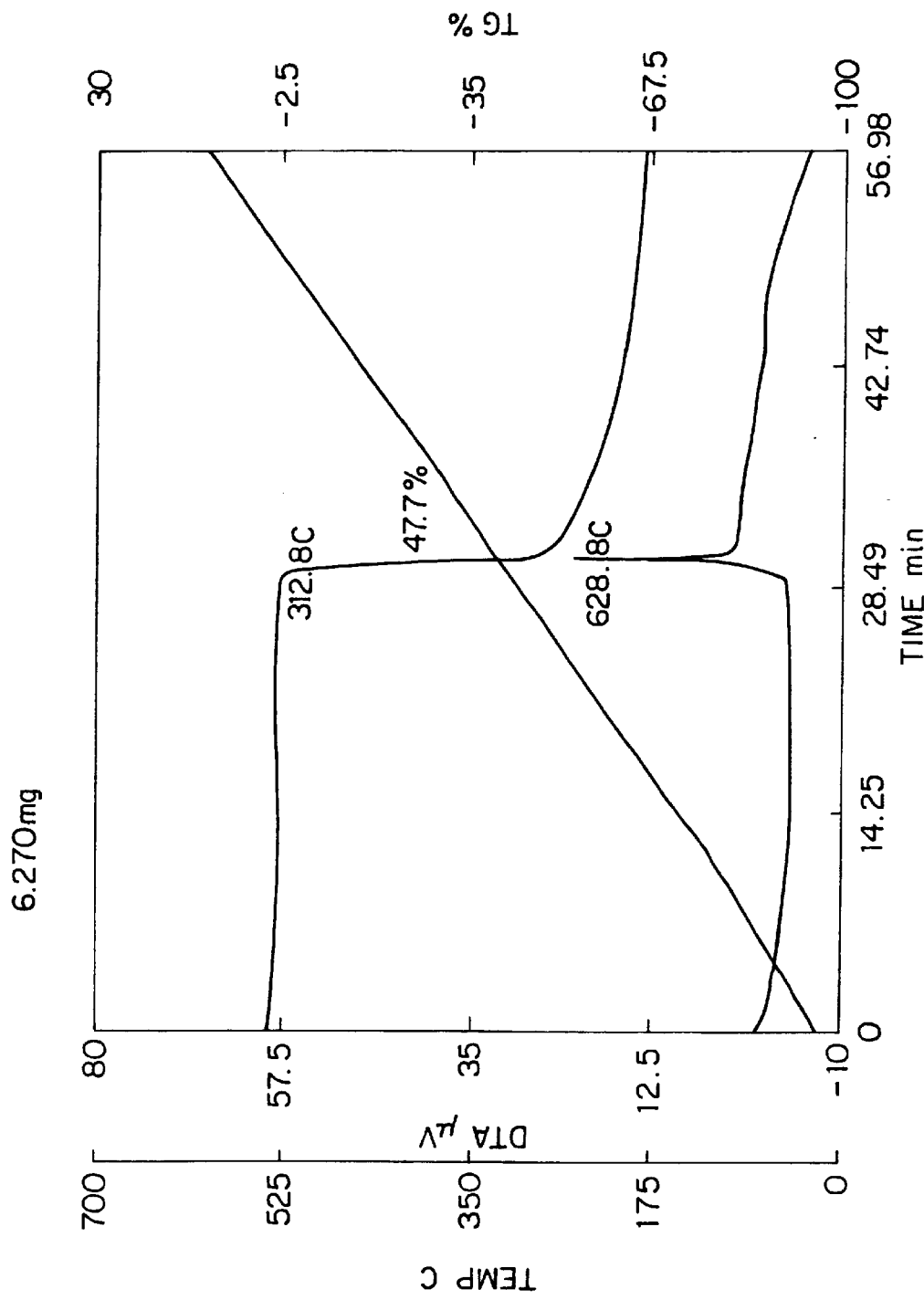
FIGS. 14 to 18 are graphs showing differential thermal analyses of pigments according to first to fifth embodiments of the present invention.
Figure 15:
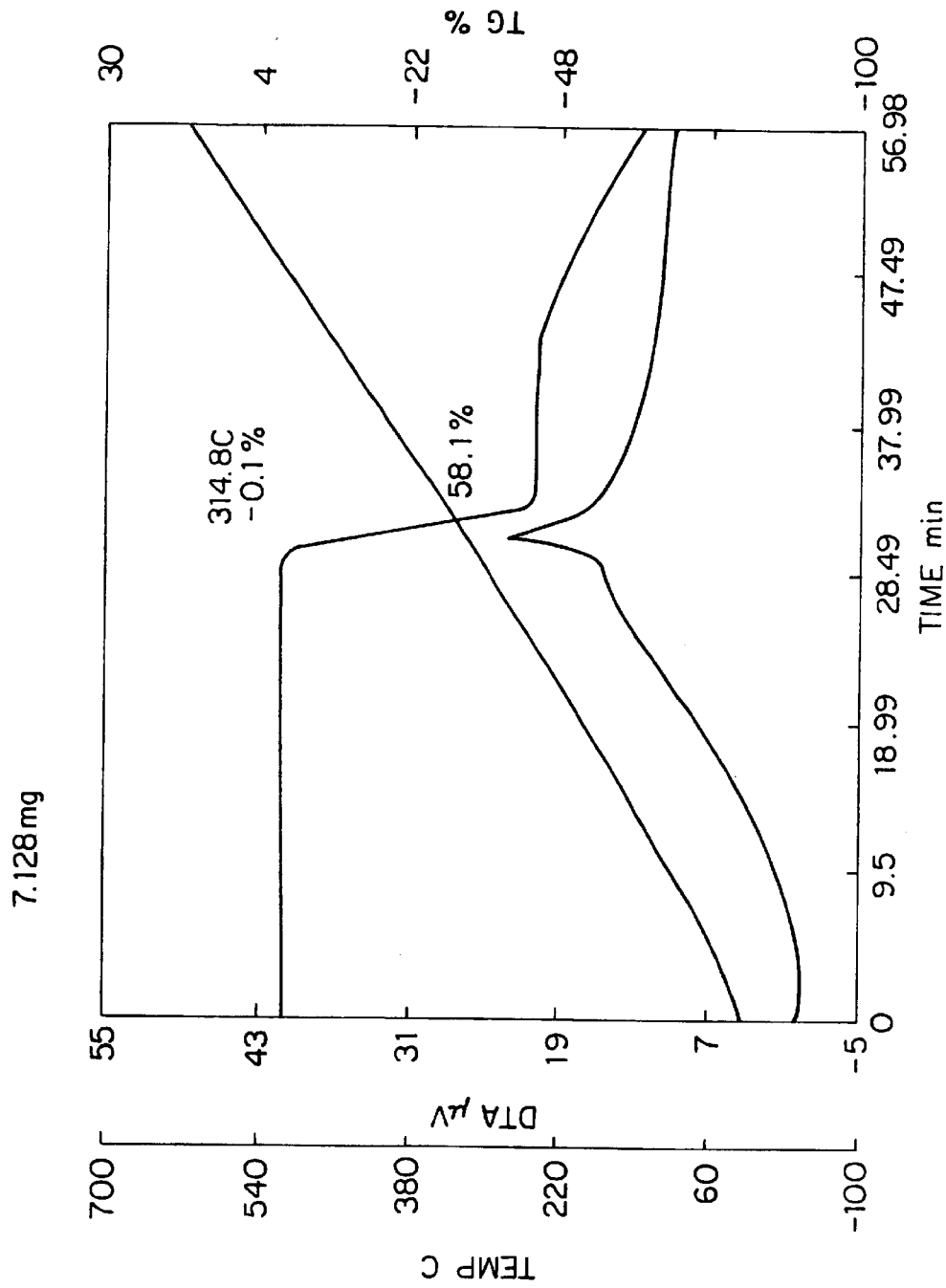
Figure 16:
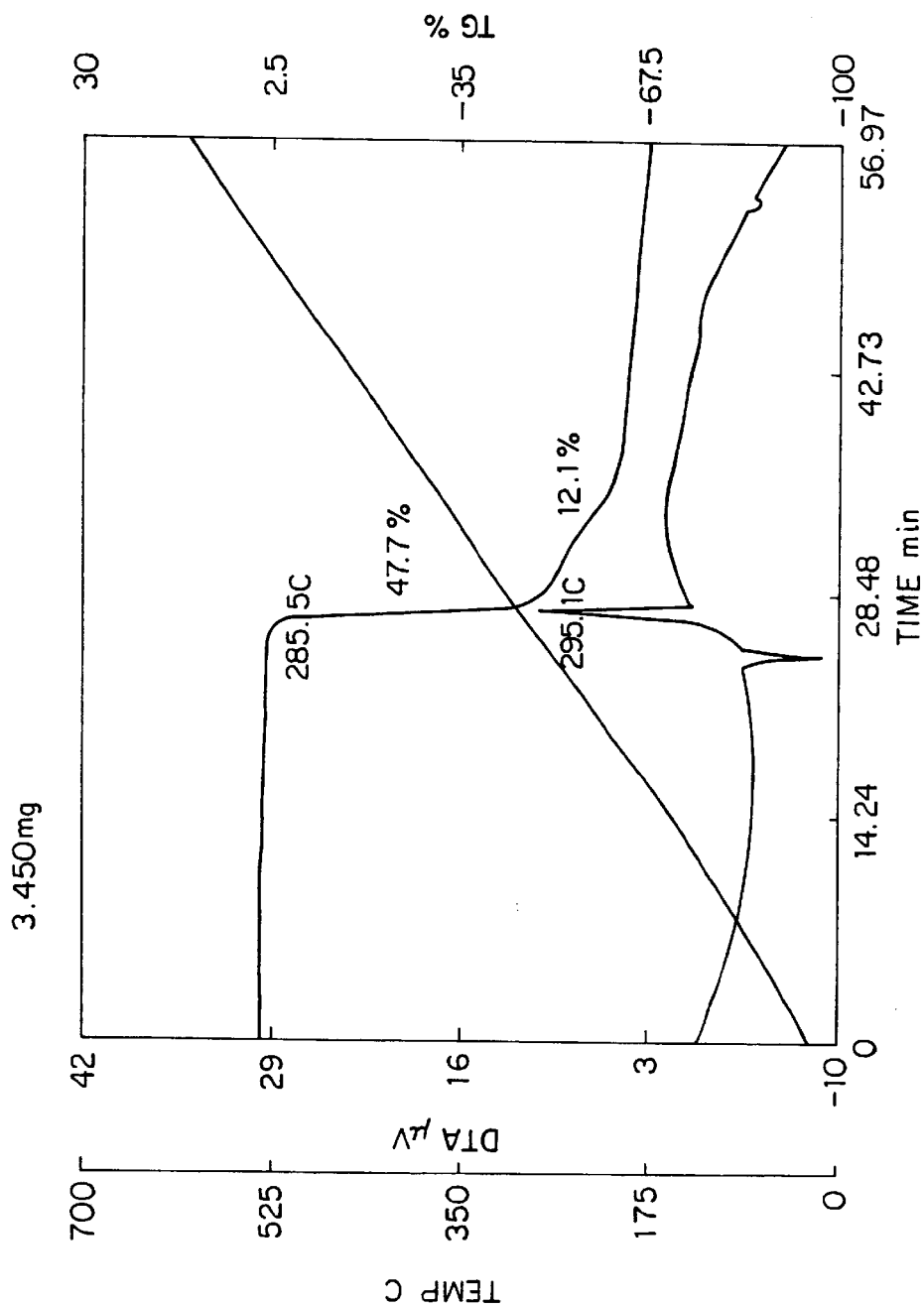
Figure 17:
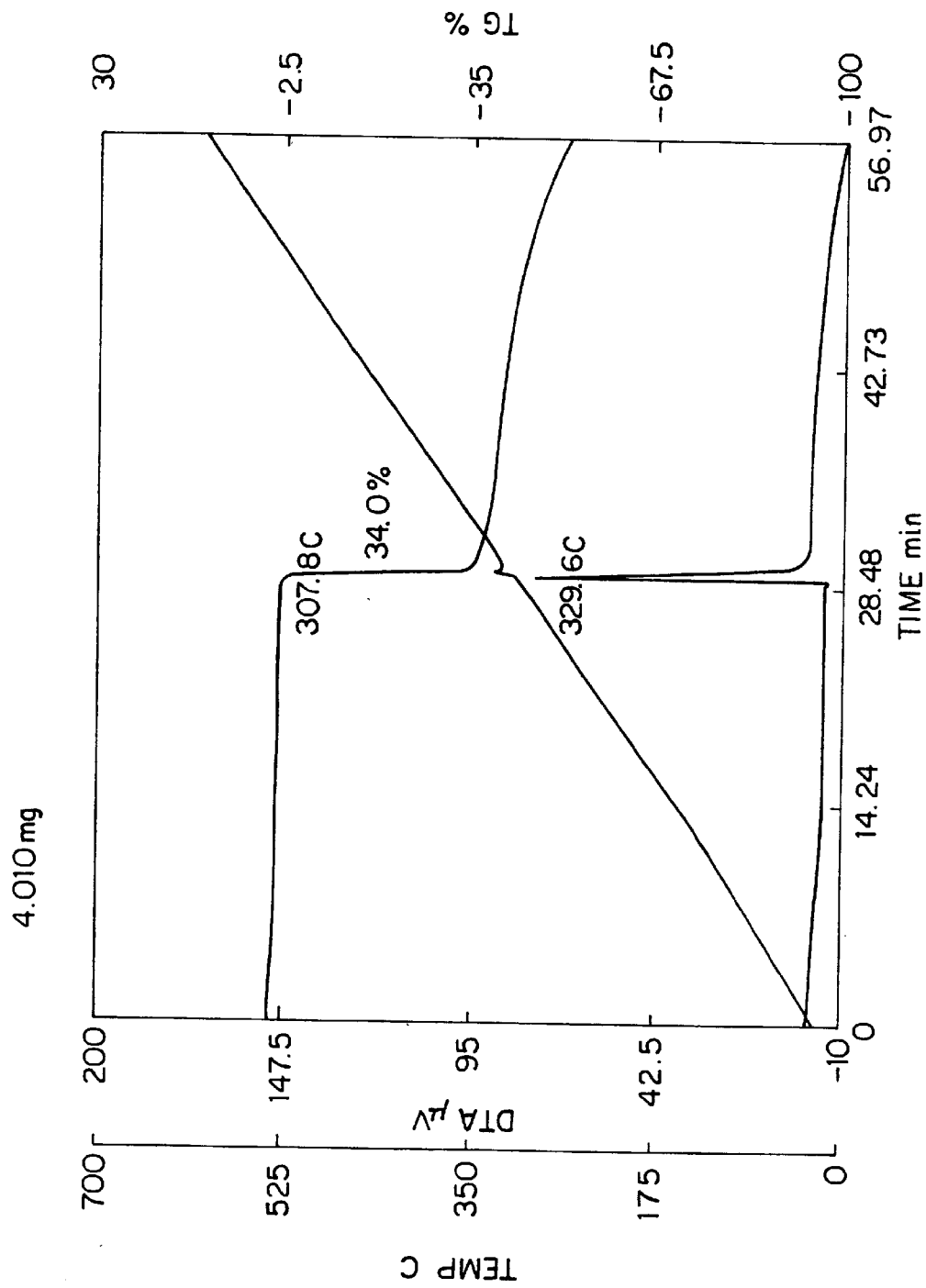
Figure 18:
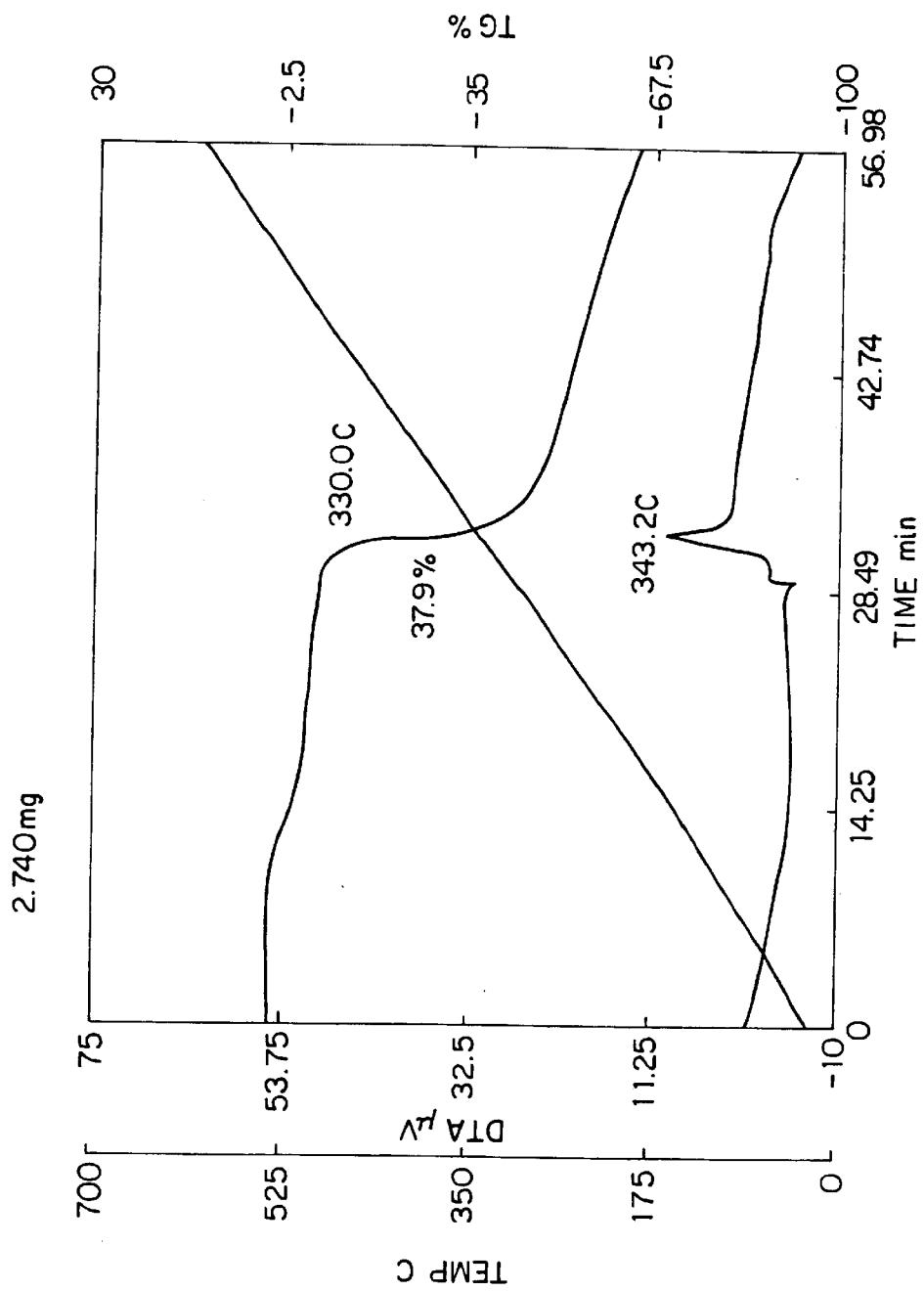
Figure 19:
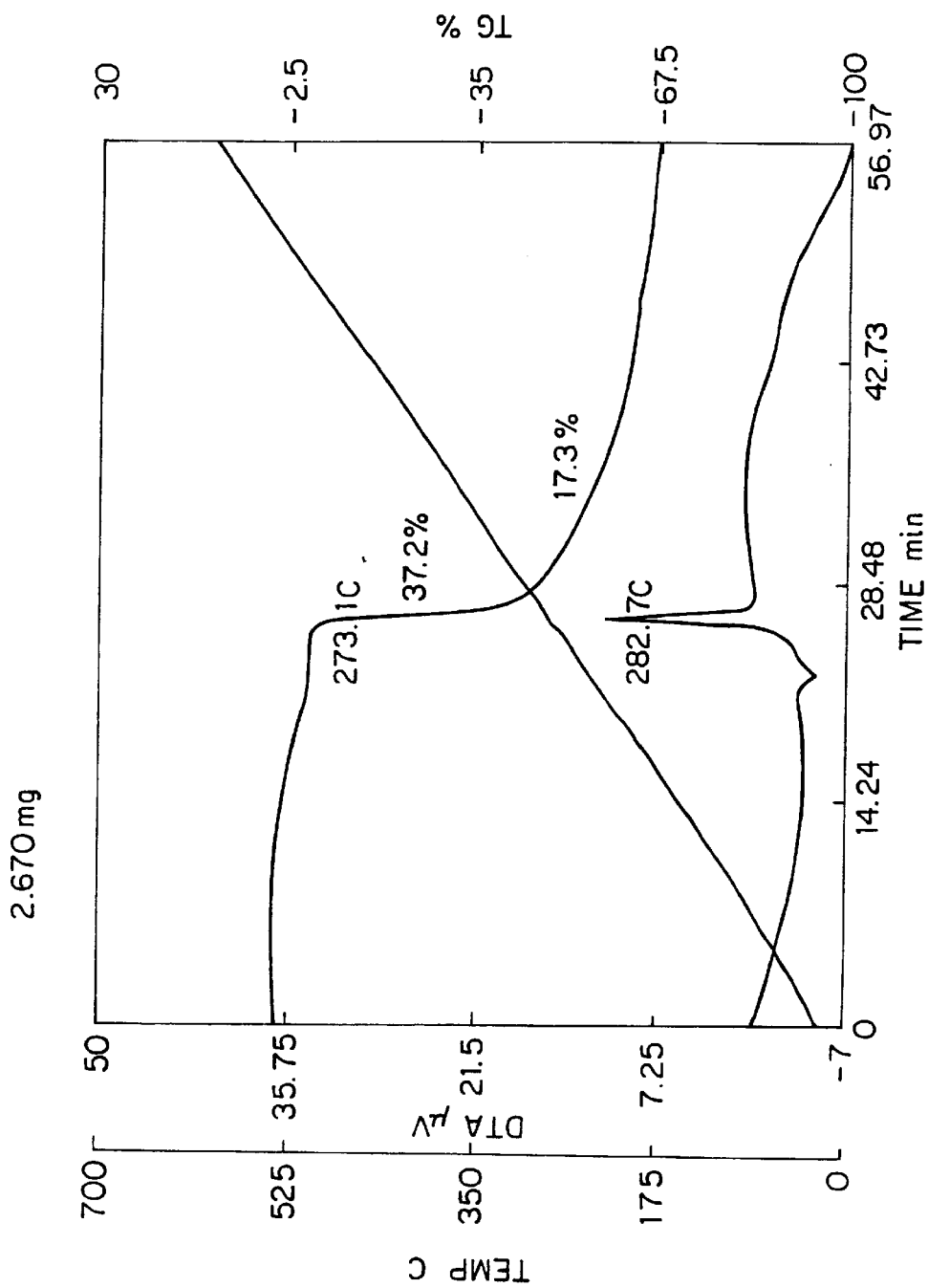
FIG. 19 is a graph similar to FIGS. 14 to 18 for showing sixth embodiment of the present invention and a comparative example.
Figure 20:
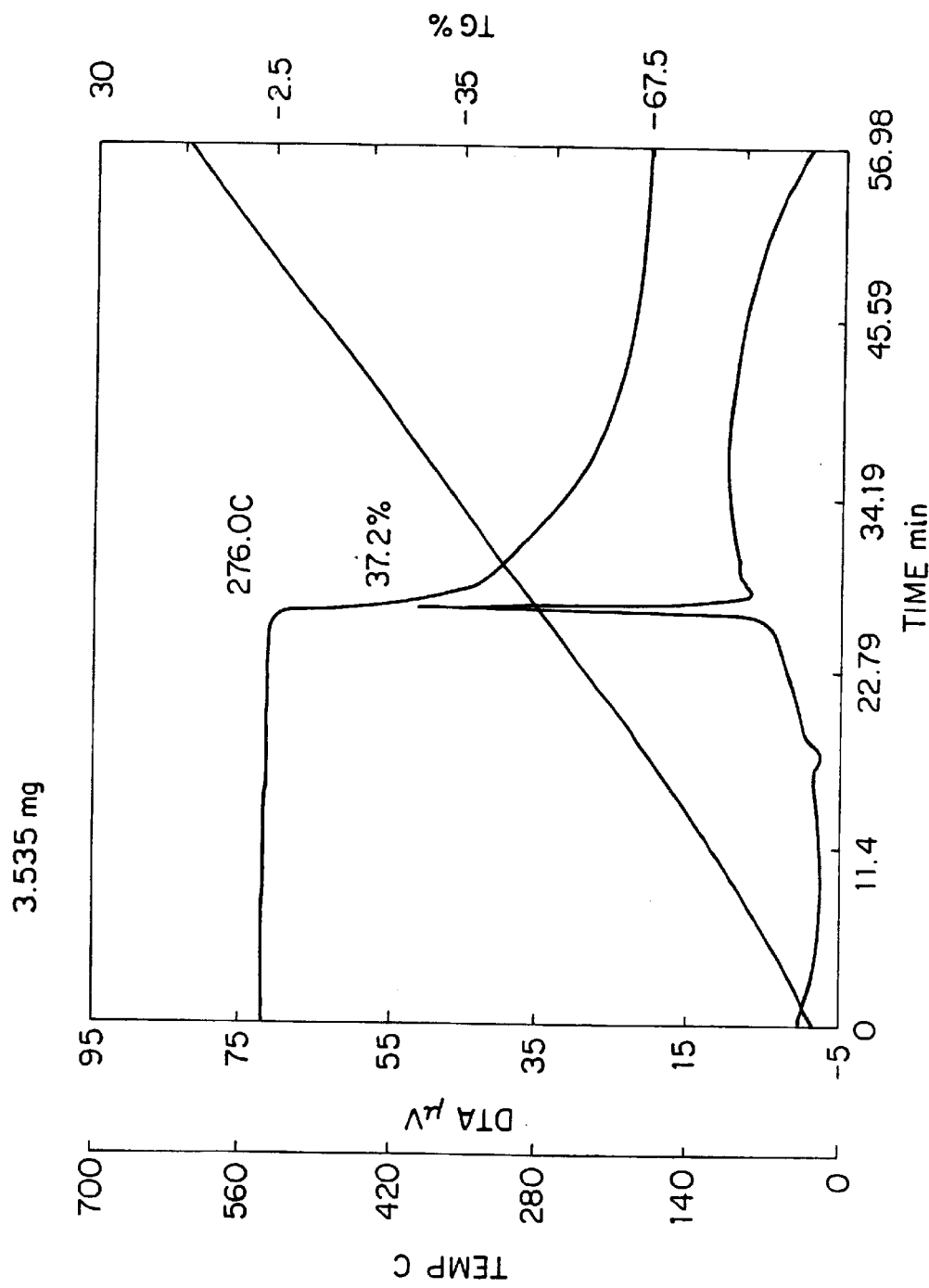
FIG. 20 to 22 are graphs similar to FIG. 19 for showing Comparative Examples 1 to 3.
Figure 21:
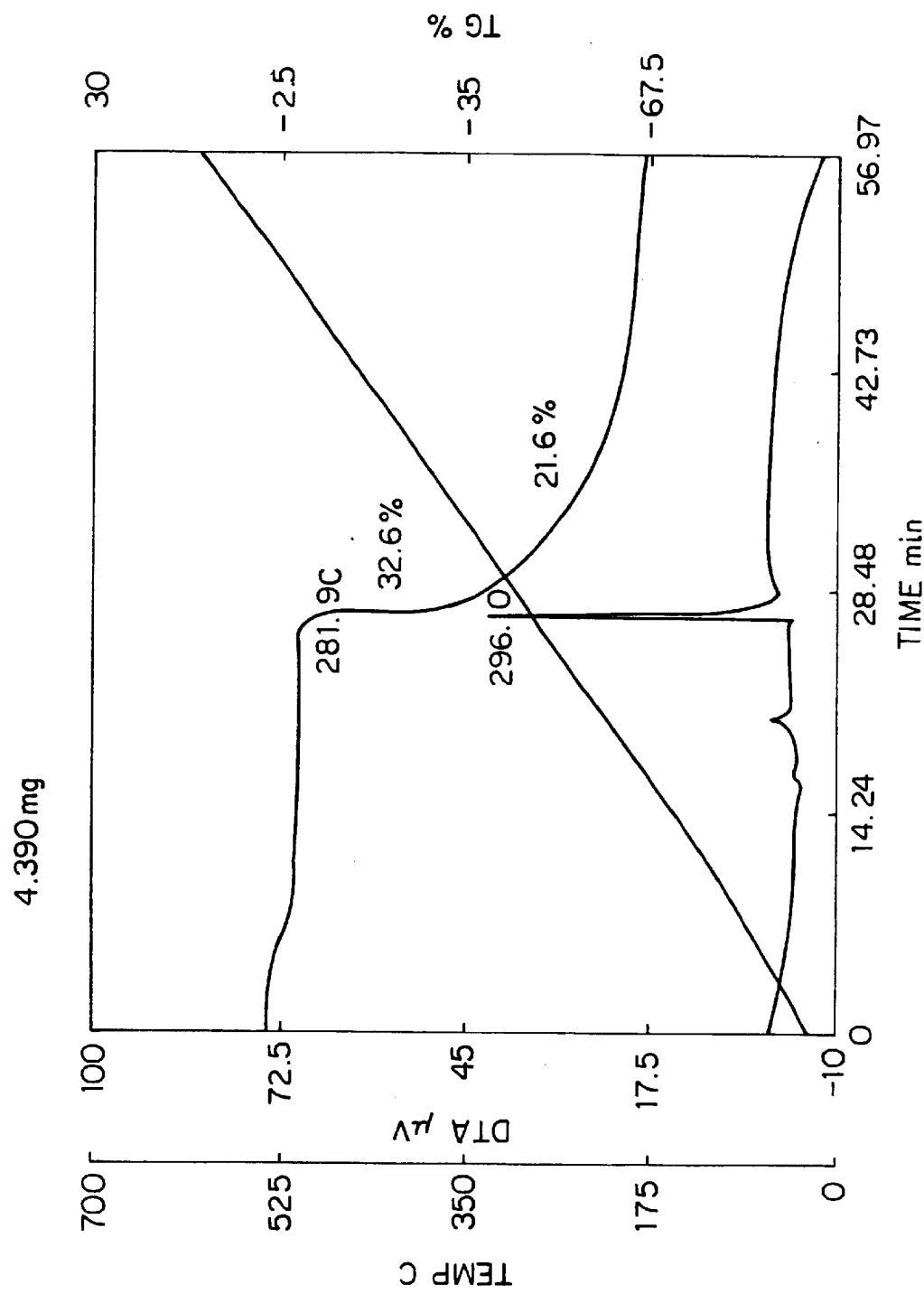
Figure 22:
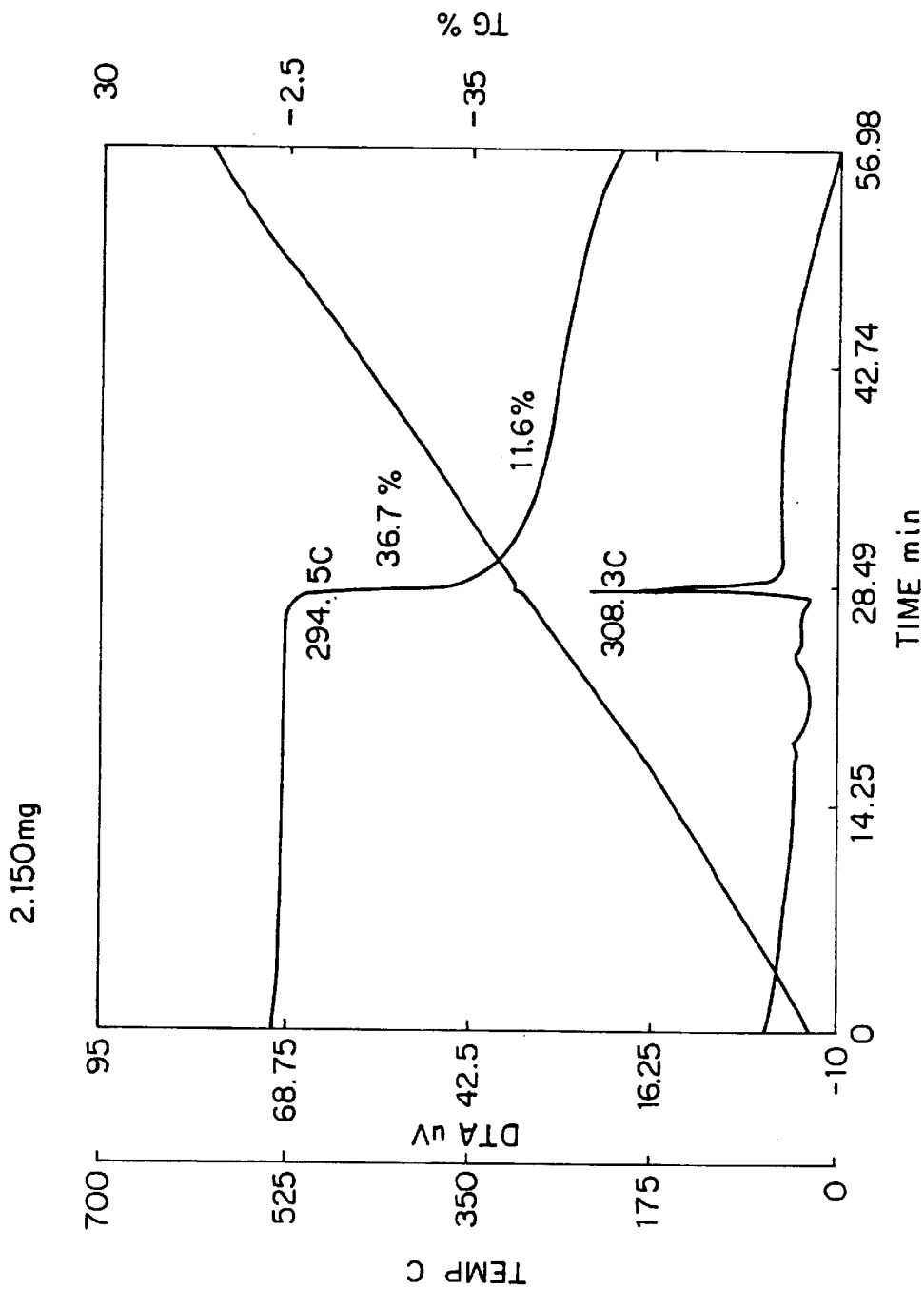

Next, the fourth aspect of the present invention will be described. Recording at a linear speed as high as equal to or above 4.9 m/s involves a new problem. Specifically, the reproducing speed for a current DVD-ROM is between 3.7 and 3.8 m/s, which is referred to as a one-time speed herein. If the reproducing speed is increased from the current speed up to or above 4.9 m/s, the temperature distribution exhibits a different aspect in the longitudinal direction of the mark compared to the one-time speed, as will be understood from the comparison between FIG. 12A and FIG. 12B. If a mark length equivalent to the mark length in the case of one-time speed is to be recorded in the recorded section, the recording power level and the maximum temperature must be raised accordingly in order to finish the recording in a smaller time length. As a result, the temperature gradient in the longitudinal direction of the mark becomes large as the linear speed increases, which involves an excess distortion of the pigment and the substrate, generating an asymmetrical distortion in the reproduced signal in the longitudinal direction, as shown in FIGS. 13A and 13B. The distortion is especially remarkable in the range of a 10T mark or larger mark in the case of a mark length recording scheme. The distortion in the signal waveform retards the design for the optimum power level and increases the jitter. Accordingly, it is preferable to suppress the distorted angle in the signal waveform below 15°, or more preferably below 10°. The distortion in the long mark may be reduced to some extent by dividing the recording pulse for the mark length recording. However, the use of the divided recording pulse is limited from the fact that it also causes reduction in the margin for the recording power level and also impairs the versatility of the disk.

The present inventors examined correspondence of the distortion in the longitudinal direction of the mark in the reproduced signal to the shape of the distortion in the recorded section to find that, in the deformation or distortion of the substrate in the recorded section for the case of a linear speed of 4.9 m/s or above and the case of a 11T or larger mark without using a pulse division technique, excellent recording characteristics can be obtained when: (i) only a moderate slope exists in the recorded section without a depression; or if the distortion is present, (ii) the depression has an edge disposed in the leading edge of the mark as viewed in the direction of reading, (iii) the depression has a center disposed in the central position of the mark, i.e., within ±10% of the total mark length from the center of the mark as viewed in the direction of reading, or (iv) the half-height width of the depression occupies a quarter of the mark length or above. On the other hand, if the distortion of the substrate for the 10T mark or longer mark is outside the specified ranges, it is likely that excellent characteristics cannot be obtained resulting from a small margin for the recording power level due to a large distortion in the reproduced signal or other reasons.

The distortion in the signal waveform from a long mark generally appears in a higher linear speed range and does not appear in a lower linear speed range as in the case of CD, or one-time speed, provided that a sufficient groove width is secured. This distortion phenomenon is different from the distortions in the mark discussed in JP-A-7-65378 or JP-A-7-98887 for the CD-R disk in its mechanisms, and is considered peculiar to the write-once disk of a small wavelength having organic pigment, such as DVD-R. In the present invention, the distortion of the substrate in the recorded section is measured by AFM recording. Specifically, after peeling-off the bonding interface and removing the upper layers including the reflective layer by using a cellophane (from Scotch Inc,) substrate surface is exposed by washing using ethanol, followed by scanning of the substrate surface by AFM to measure the difference in height within the recorded mark in the longitudinal direction thereof.

The point "A" shown in FIG. 13B is the peak of the depression, the location of which is represented by the following expression:

$$100 \times (a/L) - 50 (\%),$$

wherein the value obtained by the expression shows a deviation from the center of the mark in terms of percentage of the mark length. The term "half-height width" of the depression is the width measured at the half height or half depth of the depression. In the measurement, if a difference between the heights of two protrusions measured from the lowest portion (deepest portion) of the depression disposed therebetween is equal to or lower than 25% of the height of the higher protrusion measured from the lowest portion, the half-height is determined from the higher protrusion and the lowest portion, whereas if the difference exceeds 25%, the half-height is determined from the lower protrusion and the lowest portion after the depth of the lower protrusion measured from the lowest portion is multiplied by the ratio of the height of the higher protrusion to the height of the lower protrusion both measured from the lowest portion. The ratio of w/L is also used for the reference.

The preferred embodiments of the fourth aspect of the present invention have pigments represented by the following formulae:

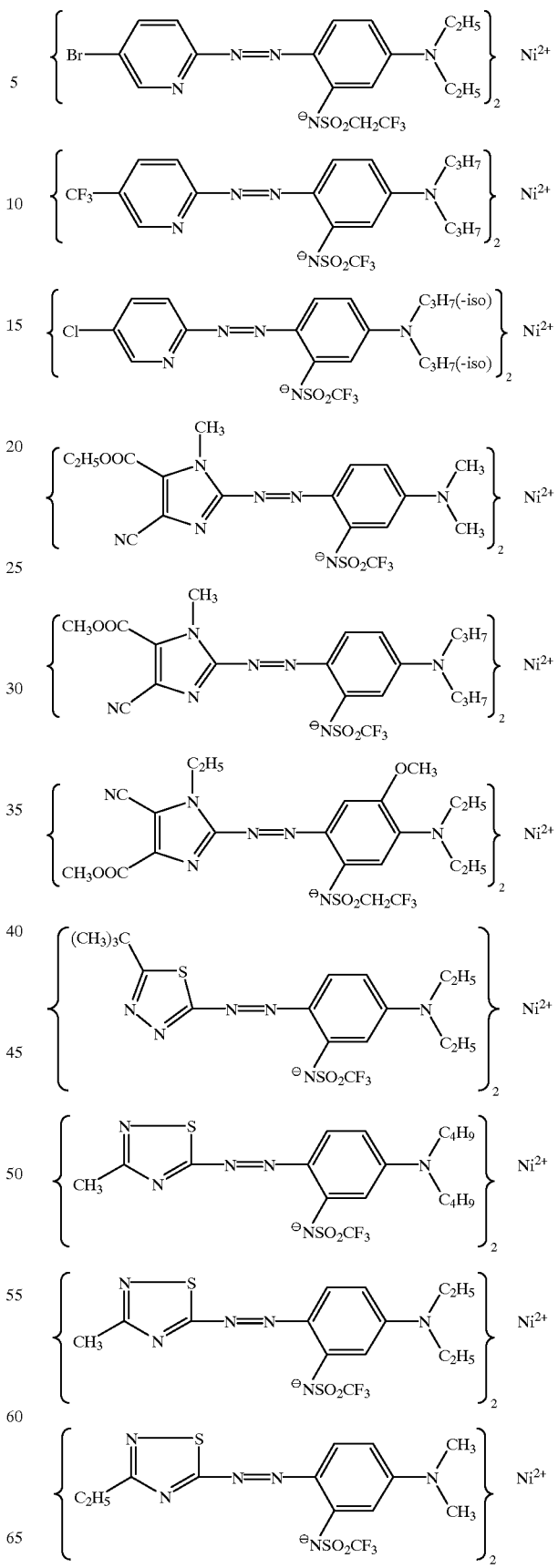

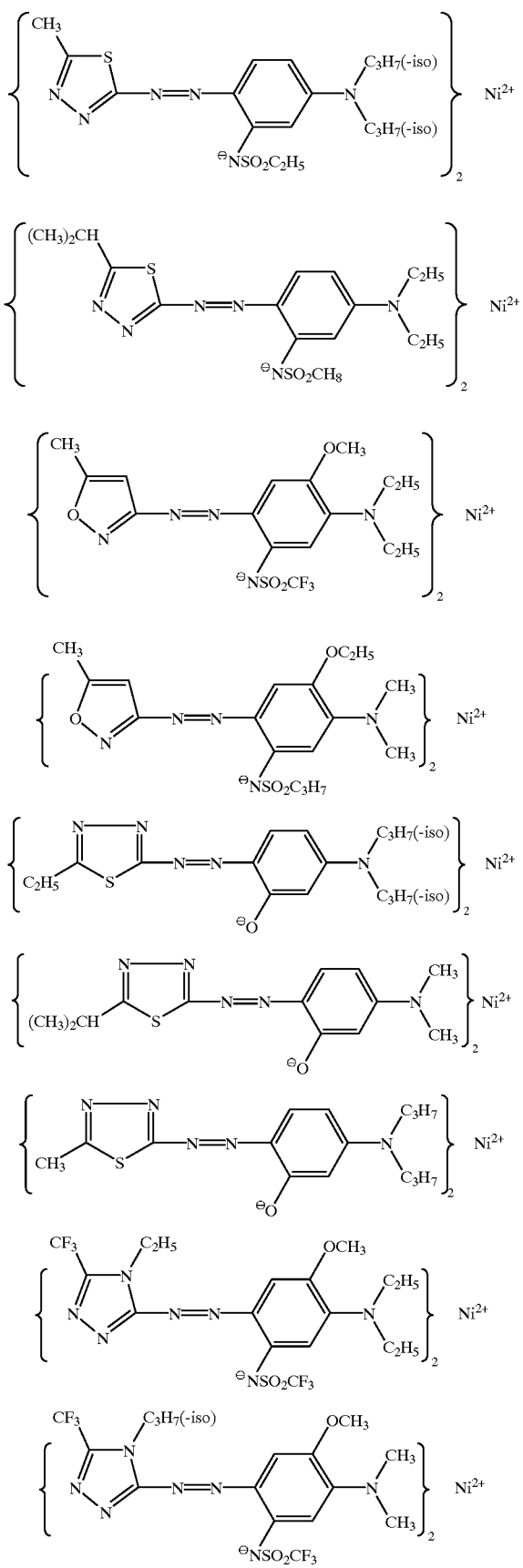

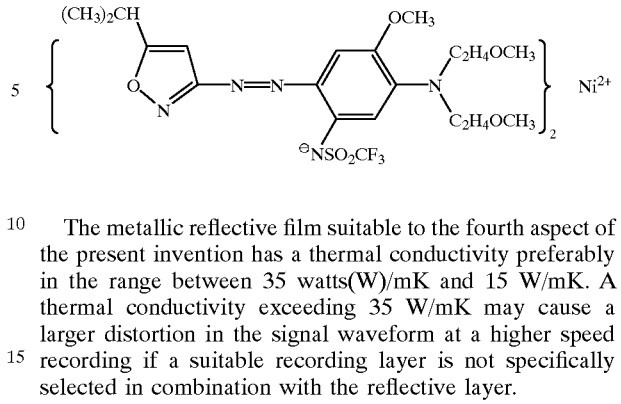

The metallic reflective film suitable to the fourth aspect of the present invention has a thermal conductivity preferably in the range between 35 watts(W)/mK and 15 W/mK. A thermal conductivity exceeding 35 W/mK may cause a larger distortion in the signal waveform at a higher speed recording if a suitable recording layer is not specifically selected in combination with the reflective layer.

EMBODIMENTS (1) Embodiments According to the First Aspect of the Present Invention:

Embodiment 1

A polycarbonate substrate is prepared which had a thickness of 0.6 mm and comprised a U-shaped guide groove having a groove depth of 150 nm and a groove width (half-height width) of 0.25 μm. AFM measurements showed that a track pitch was 0.80 μm and Lp was 70% of L. A metal-containing azo pigment shown by the following formula:

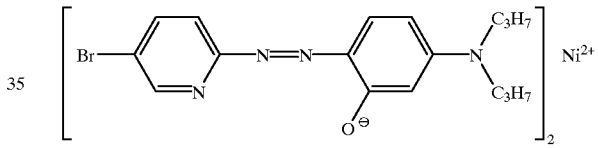

was spin-coated onto the polycarbonate substrate at 800 rpm. after dissolving 0.06 g azo pigment into 5 g octafluoropentanol (OFP), followed by annealing the azo pigment for an hour in an oven heated at 80° C. to form a recording film. The weight reduction property of the pigment is the type shown in FIG. 3, wherein the weight reduction in the main weight reduction process, temperature difference, weight reduction rate, starting temperature of the main weight reduction process and total weight reduction were 37.1%, 3.6° C., 10.3%/° C., 280° C. and 47%. The thermogravimetric analysis (TGA) was effected by using a differential thermal analyzer (TG-DTA-320 in SSC5200H series from Seiko Electronic Corp). The refractive index "n" and extinction coefficient "k" of the single layer pigment thus obtained were 2.3 and 0.05, respectively, at a 640 nm wavelength, and the absorption peak was at a 588 nm wavelength.

The above-mentioned dye solution was spin-coated on the substrate, which had a track pitch of 1.6 μm and a guide groove of 160 nm in depth, under the above-mentioned conditions. The disc was annealed at 80° C. for an hour and taken out after cutting, followed by measuring the optical absorbance thereof with reference to air using a spectrophotometer (from Shimadzu Seisakusho Ltd.). The resultant absorbance was A1=0.05, A0=0.62, and A0/A1=0.08. The same dye solution was spin-coated on a substrate having a track pitch of 0.8 μm under similar conditions, annealed at 80° C. for an hour, and subjected to measurement of the absorbance with reference to a similar substrate. The resultant absorbance was A1=0.09, A0=0.57 and A1/A0=0.16.

Onto the recording film as described above, silver was sputtered to a thickness of 100 nm, and the resultant sample was subjected to a measurement of groove depth $d_{film}$ at the coated film by using an AFM, which showed a depth of 70% of the groove depth $d_{sub}$ at the substrate or groove depth before spin-coating. In the sample, the film thickness $d_{land}$ on the land area was 80 nm, and accordingly, the film thickness $d_{groove}$ at the groove area was calculated at 125 nm. On the silver layer as described above, a UV-cured resin (SD-318 from Dainippon Ink And Chemicals, Incorporated) was spin-coated to a thickness of 3 $\mu$m, followed by curing by using a UV lamp to form a disk. Two of the disks thus fabricated were bonded together by a hot melting method to form a bonded disk. The bonded disk was subjected to recording an EFM signal (n−1)T, which corresponds to four times the velocity of CD-R disk, at a linear velocity of 2.7 m/s by using a semiconductor laser tester having a numerical aperture NA of 0.6 and using a 640 nm wavelength, thereby forming an excellent 6.4 mW eye pattern, wherein the center of the eye is located at the center of a 11T pulse. In these conditions, reflectivity without PBS ($I_{top}$)=60% and $I_{11}$// $R_{top}$=65% were obtained, wherein $R_{top}$ is a reflectivity with PBS as measured, and the jitter for the minimum mark length of about 0.4 $\mu$m was as low as 9ns, thereby showing an excellent results of the present invention.

The signal thus recorded on the groove was reproduced on the land area adjacent to the recorded sections of the groove, which provided a signal amplitude of 38% of the signal amplitude of the signal reproduced on the groove, showing excellent, low cross-talk, wherein the jitter was as low as 1ns at the land area sandwiched between the recorded tracks of the groove.

The bonded disk was then peeled off at the interface, the reflective film was flaked off using a two-sided tape, the pigment was flushed away using ethanol, and the transformation of the substrate was observed in the recorded section by an AFM. The AFM showed a 20 nm convex projection and a transformation of the groove width, which was as low as 1.4 times the groove width at the unrecorded section and thereby formed an excellent small recording mark. The reflectance of the disk corresponded to the first interference mound shown in FIG. 2, which was determined in consideration of n=2.3, k=0.05 and a film thickness of 125 nm at the groove area. It was calculated from the results that $n_{abs} \cdot d_{groove}/\lambda$=0.45, and $\Delta C$=(0.125−0.08)×2.3/$\lambda$=0.16, wherein $\lambda$=640 nm.

The following calculations such as for "n" and "k" are based on also $\lambda$=640 nm.

Embodiment 2

A bonded disk was fabricated in the present embodiment similarly to Embodiment 1 except for the rotational speed of the substrate during spin-coating of the dye solution, which was 600 rpm. in the present embodiment. Absorbance of the pigment film was measured with a reference of a substrate which was similar to the substrate on which the pigment film was formed, resulting in A1=0.11, A0=0.68, and A1/A0= 0.16. The film thickness $d_{land}$ of the recording film at the land area was 95 nm, and the groove depth $d_{film}$ at the recording film was 78% of the groove depth $d_{sub}$ at the substrate, which corresponded to a film thickness $d_{film}$ of 128 nm at the groove area. The resultant disk was subjected to recording at a 640 nm wavelength similarly to Embodiment 1, resulting in $I_{top}$=60%, $I_{11}/R_{top}$=70%, and jitter for the minimum mark length of about 0.4 $\mu$m being 9ns for the disk. The cross-talk and transformation of the recorded section of the substrate were similar to those of Embodiment 1. The reflectance corresponded to the first interference mound, similarly to Embodiment 1, and $n_{abs} \cdot d_{groove}/\lambda$=0.46 and $\Delta C$=0.12 were obtained.

Embodiment 3

A bonded disk was fabricated in the present embodiment similarly to Embodiment 1 except for the pigment which had a chemical structure expressed as follows:

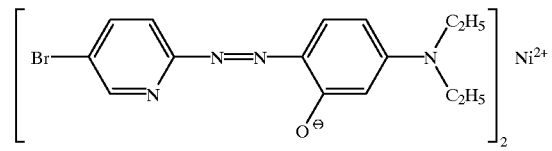

The refractive index "n" and extinction coefficient "k" of the single-layer pigment were 2.5 and 0.05, respectively, at a 640 nm wavelength. The liquid pigment was spin-coated onto a substrate which had a track pitch of 1.6 $\mu$m and a guide groove of 160 nm in depth, annealed at 80° C. for an hour, taken out after cutting, and subjected to measurement of the absorbance with reference to air, which showed an absorbance A1=0.06, A0=0.65, and A1/A0=0.09 after subtracting the base line absorbance. The film thickness $d_{land}$ of the recording film at the land area was 80 nm, the groove depth $d_{film}$ at the recording film in the recorded section was 75% of the groove depth $d_{sub}$ at the substrate, and accordingly, the film thickness $d_{groove}$ of the recording film at the groove area corresponded to 120 nm.

The resultant disk was subjected to measurement similarly to Embodiment 1 in similar conditions, which showed $I_{top}$=63%, $I_{11}/R_{top}$=70%, and jitter for the minimum mark length of about 0.4 $\mu$m being 9 ns. The cross-talk of the disk was 40%, and the groove width W1 of the substrate at the recorded section was 1.4 times the groove width W0 at the unrecorded section. The reflectance of the disk corresponded to the first interference mound shown in FIG. 4, wherein $n_{abs}$ $d_{groove}/\lambda$=0.47 and $\Delta C$=0.16 were obtained in consideration of n=2.4, k=0.05, and the film thickness at the groove being 120 nm. The main weight reduction of the pigment in the present embodiment is shown in FIG. 13, and the weight reduction in the main reduction process was 41%, the temperature difference was 3.6° C., the weight reduction rate was 11.4%/° C., and the total weight reduction was 41%, with the starting temperature of the main weight reduction being 317° C.

Embodiment 4

A bonded disk was fabricated similarly to Embodiment 1 except for the pigment which had a structure expressed as follows:

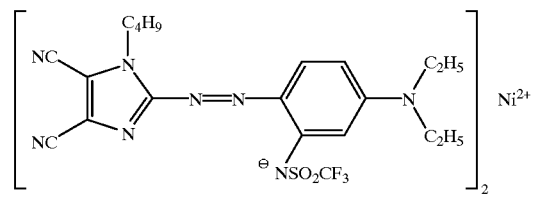

The weight reduction of the pigment in the main weight reduction process, weight reduction rate, starting temperature of the main weight reduction and the total weight reduction were 37.6%, 2.6%/° C., 330° C. and 45.7%, respectively. The refractive index "n" and extinction coefficient "k" of the single-layer pigment were 2.6 and 0.05, respectively, at a 640 nm wavelength, and the absorption peak was at 595 nm.

Dye solution was spin-coated onto a substrate having a track pitch of 1.6 μm and a guide groove of 160 nm in depth, and the resultant recording film was subjected to measurement which showed an absorbance A1=0.05, A0=0.65 and A1/A0=0.077. $I_{top}$ of the resultant disk was 55%, and the modulation factor and the jitter for the minimum mark length were $I_{11}/R_{top}$=60% and 10 ns, respectively, at a recording power level of 5.8 mW, showing excellent recording characteristics of the pigment. The calculated film thickness corresponded to the first interference mound of the reflectance, similarly to Embodiment 1.

Comparative Example 1

A bonded disk was fabricated similarly to Embodiment 1 except that the amount of the pigment was 0.1g, the substrate had a track pitch of 0.8 μm and a guide groove of 180 nm in depth, and the rotational speed of the substrate during the spin-coating was 600 rpm., in this example. The film thickness $d_{land}$ of the resultant recording film at the land area was 120 nm, the groove depth $d_{film}$ at the recording film was 60% of the groove depth $d_{sub}$ at the substrate, and accordingly, the film thickness $d_{groove}$ at the groove corresponded to 190 nm. The liquid pigment was spin-coated onto a disk which had a track pitch of 160 nm and a groove depth of 160 nm, annealed at 80° C. for an hour, taken out after cutting, and subjected to measurement of absorbance, which showed A1=0.07, A2=0.7 and A1/A2=0.1. The bonded disk was subjected to recording similarly to Embodiment 1 in similar conditions, resulting in a poor reflectance as low as 40%, jitter as high as 15 ns which retarded recording of a small mark length. The reflectance of the disk was 640 nm and corresponded to the second interference mound shown in FIG. 4, in view that "n" and "k" were 2.5 and 0.05, respectively. The value of $n_{abs} \cdot d_{groove}/\lambda$ was 0.73, and Δc was 0.26.

Comparative Example 2

A bonded disk was fabricated in the present example, similarly to Embodiment 1, except for the pigment which had a chemical structure in this example expressed as follows:

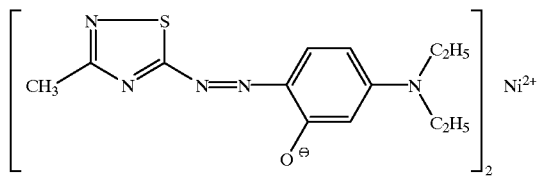

Liquid pigment was spin-coated onto a substrate, similarly to Comparative Example 1, and subjected to annealing and measurement of absorbance, which showed A1=0.04, A0=0.68, and A1/A0=0.06. The film thicknesses $d_{groove}$, $d_{land}$ at the groove area and the land area of the present example were 80 nm and 120 nm, respectively, similar to those in Embodiment 1. The refractive index "n" and extinction coefficient "k" were 2.3 and 0.03, respectively, which meant that the reflectance corresponded to the first interference mound shown in FIG. 1, wherein $n_{abs} \cdot d_{groove}/$ λ=0.43 and ΔC=0.14. The bonded disk was subjected to recording, similarly to Embodiment 1, and showed $I_{top}$=65%, $I_{11}/R_{top}$ corresponding to about 50% at a recording power level of 10 mW. Further, the recording power level to place the eye center at the center of a 11T signal far exceeded 10 mW, showing a poor sensitivity of the recording film. The starting temperature of the main weight reduction of the recording film was 302° C., which corresponded to FIG. 8, the main weight reduction was 59.8%, the temperature difference was 5.49° C., and accordingly, the weight reduction rate was 10.9%/° C. and the total weight reduction was 59.8%.

Comparative Example 3

A bonded disk was fabricated in the present embodiment, similarly to Embodiment 1, except for the pigment which had a chemical structure expressed as follows:

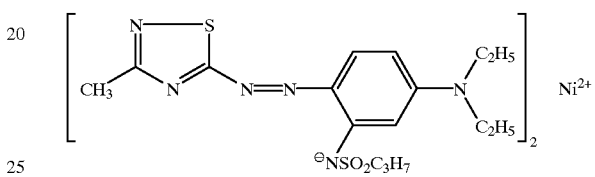

Liquid pigment was spin-coated onto a substrate, similarly to Comparative Example 2, and subjected to annealing and measurement of absorbance, which showed A1=0.12, A0=0.60, and A1/A0=0.2. The bonded disk was subjected to recording, similarly to Embodiment 1, and showed as low as $I_{top}$=48%, thereby exhibiting a poor reflectance. The refractive index "n" and extinction coefficient "k" of the single layer pigment were 2.4 and 0.1, respectively. The film thicknesses $d_{groove}$, $d_{land}$ at the groove area and the land area were about 90 nm and 140 nm, respectively. The starting temperature of the main weight reduction of the recording film was 284°, the weight reduction in the main weight reduction was 56.9%, the temperature difference was 3.6° C., the total weight reduction was 59.8%, and accordingly, the weight reduction rate was 15.8%/° C.

(2) Embodiments According to the Second and Third Aspects of the Present Invention:

Embodiment 5

A recording film was formed on a polycarbonate substrate of a 0.6 mm thick, which comprised a U-shaped guide groove having a guide depth of 150 nm and a groove width of 0.25 μm (half depth value) with a 0.80 μm pitch as measured by an AFM, by spin-coating liquid pigment, wherein 0.06 g of a metal-containing azo pigment having a chemical structure expressed as follows:

[IV]

Figure 2:
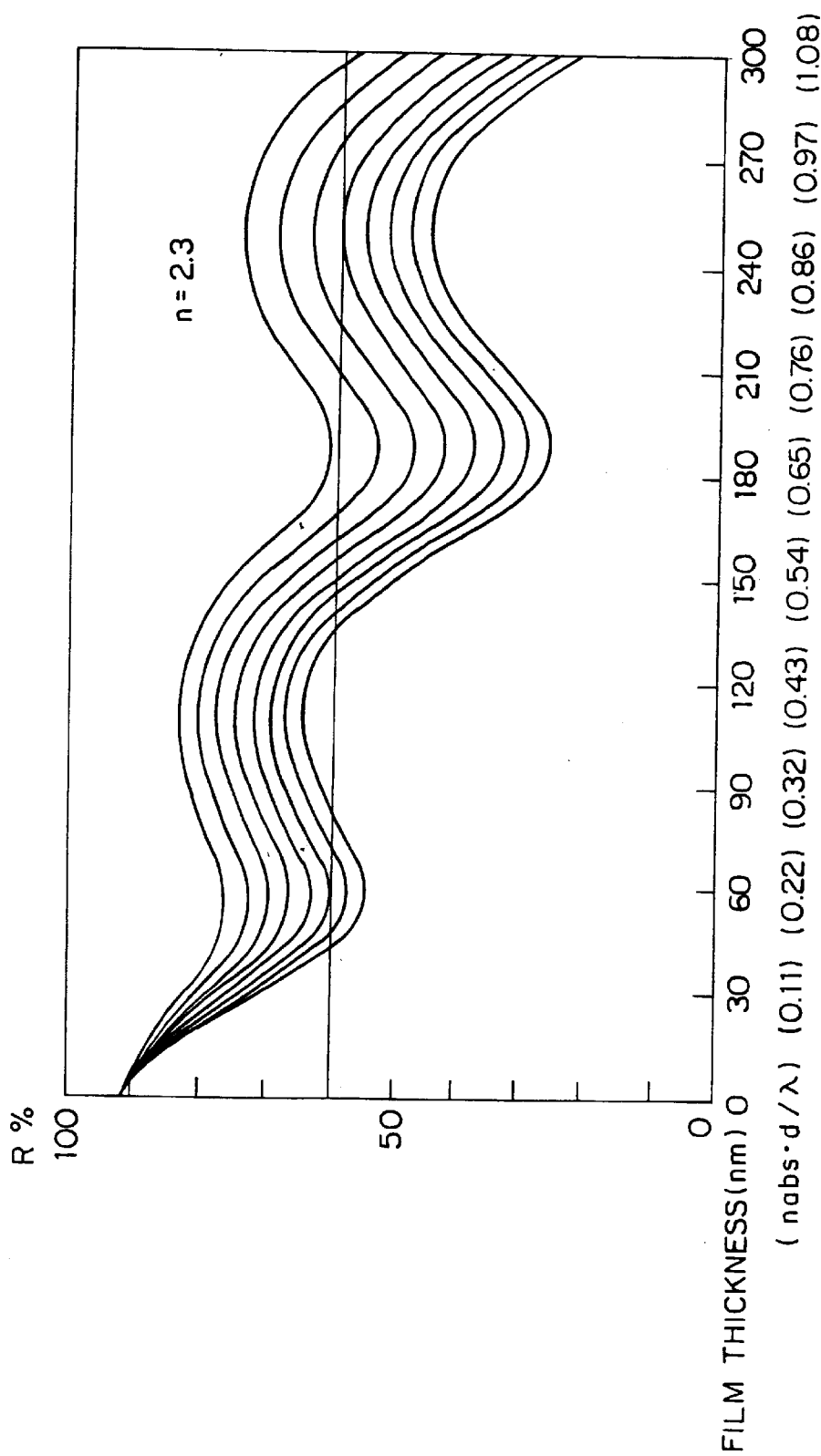
Figure 3:
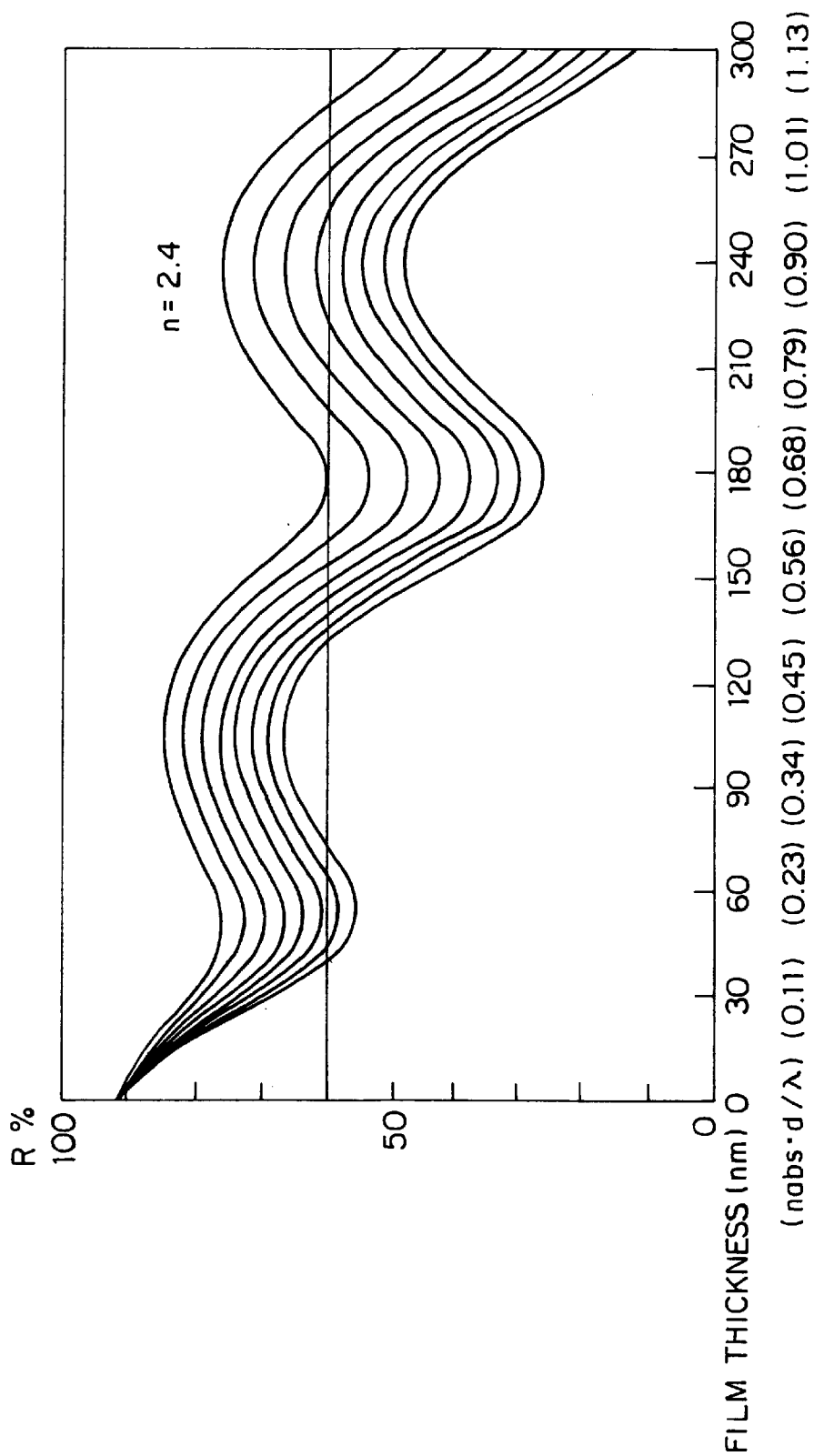
Figure 4:
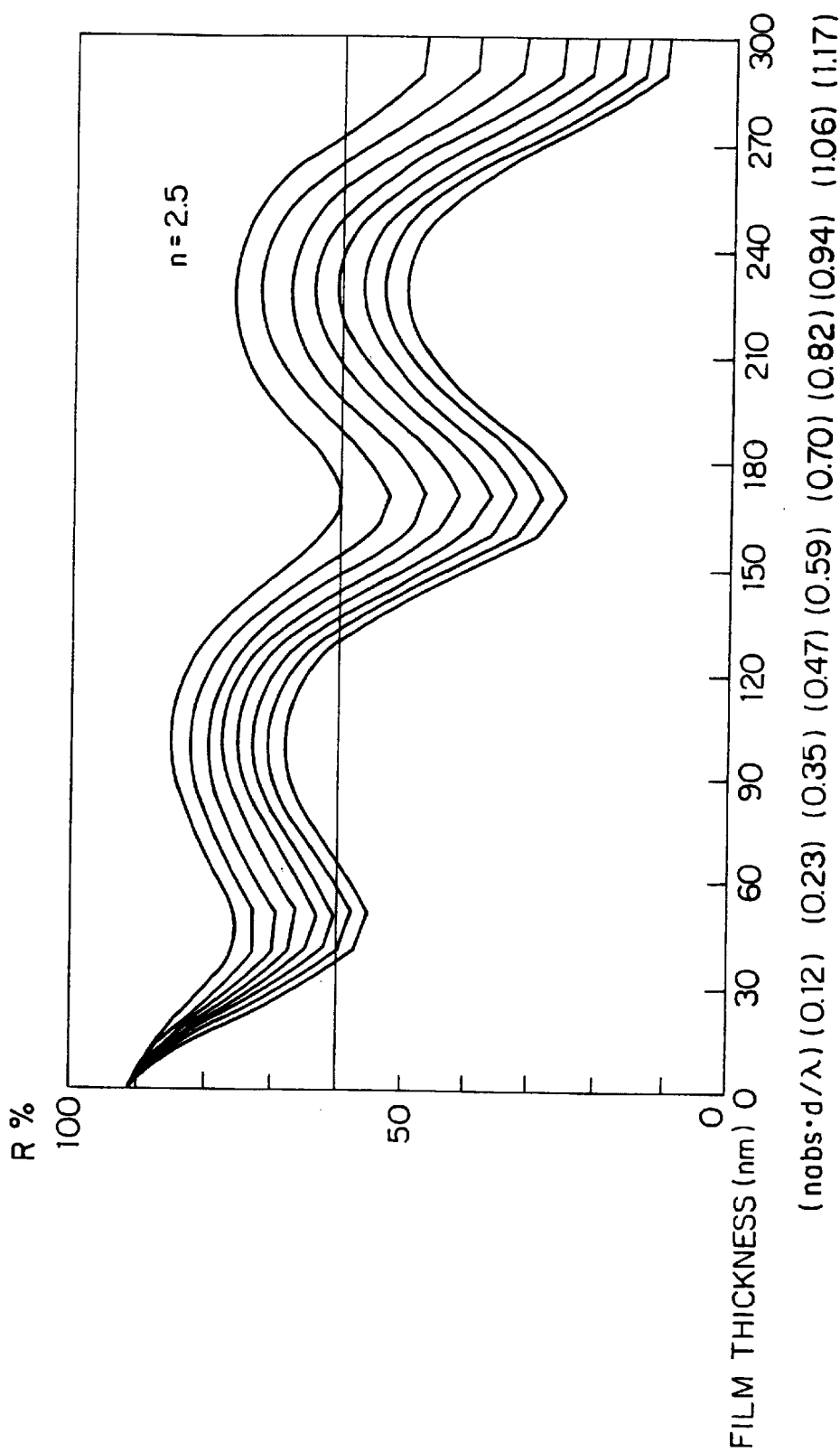
Figure 5:
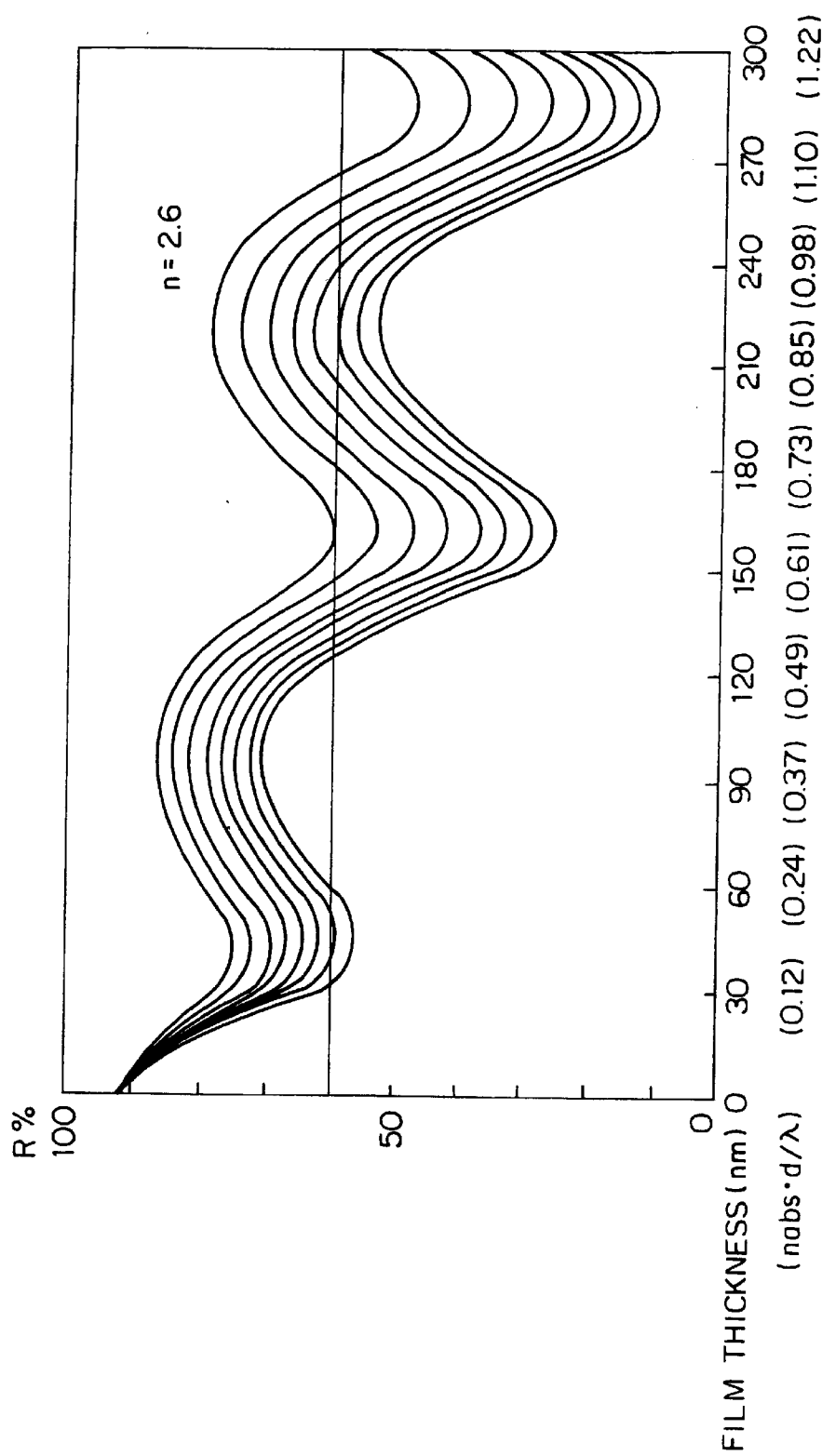

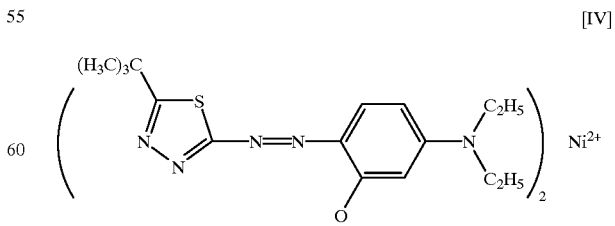

was dissolved in 5 g of octafluoropentanol (OFP). The resultant recording layer was spin-coated at 800 rpm, annealed for an hour in an oven at 80° C. The weight reduction characteristic of the pigment is shown in FIG. 2, wherein the weight reduction during the main weight reduction process was 47.0%, the temperature difference was 7.1° C., the weight reduction rate was 6.6%/° C. with the starting temperature at 313° C. in the main weight reduction, the total weight reduction was 59.7%, exothermic peak was +3.4 μV/mg, and the peak width was 14.7° C. Thermogravimetric analysis and differential thermal analysis were effected by using a differential thermal analyzer (TG-DTA-320 in SSC5200H series from Seiko Electronic COrp.). The refractive index "n" and extinction coefficient "k" of the single layer pigment were 2.2 and 0.06, respectively, at a 640 nm wavelength, and the absorption step was 577 nm.

Onto the recording layer, gold is sputtered to a thickness of 100 nm, and the groove depth at the recording film was measured by using an AFM, which showed that the groove depth $d_{film}$ at the film was 55% of the groove depth $d_{sub}$ at the substrate. The film thickness $d_{land}$ at the land area was 80 nm, and accordingly, the film thickness $d_{film}$ at the groove area corresponded to 140 nm. A UV-cured resin (SD-318 from Dainippon Ink And Chemicals, Incorporated) was then spin-coated on the metallic layer to a thickness of about 3 μm, and cured by using a UV lamp to fabricate a disk. Two of the disks thus fabricated were bonded together by a hot melting method to form a bonded disk. The bonded disk was subjected to recording an EFM signal (n−1)T, which corresponds to four times the speed of CD-R disk, at a linear velocity of 2.7 m/s by using a semiconductor laser tester (NA=0.6) using a 640 nm wavelength, and provided an excellent eye pattern wherein the center of the eye is located at the center of a 11T pulse at a 7.4 mW recording power level. In this condition, $I_{top}$=50%, $I_{11}/R_{top}$=68% and jitter of 9 ns for 3T pulse were obtained. After reproducing the data thus recorded on the groove area at the groove and the land, a signal amplitude reproduced at the land area was 38% of the signal amplitude reproduced at the groove area, which corresponded to jitter of 1ns, thereby exhibiting excellent low cross-talk. After peeling off the bonded disk at the interface and flaking off reflective film by using a two-sided tape, the pigment was washed away from the disk. Observation of the transformation of the substrate at the recorded section revealed a convex protrusion of about a 20 nm height on the substrate, which corresponded to 1.1 times of the transformation of the substrate at the unrecorded section, thereby showing a sufficient small recorded mark.

Embodiments 6–10 and Comparative Examples 4–7

Each of the following embodiments and comparative examples had a substrate and a UV-cured resin film similar to those used in Embodiment 1, and had a reflective film made of gold of 100 nm in thickness except for Embodiment 9, which had a reflective film made of silver of 100 nm in thickness. The pigment used therein had chemical structures shown below, and the recording conditions are similar to those used in Embodiment 1. The recording characteristics observed are shown in Table 1, wherein the cross-talk are calculated as a ratio (%) of the signal amplitude at the land area to the signal amplitude at the groove area on which a signal is recorded for sandwiching the land area. In each case, the film thickness $d_{land}$ at the land area was 80 nm to 90 nm, the groove depth $d_{film}$ at the coated film was 55 to 60% of the groove depth $d_{sub}$ at the substrate, which corresponded to a film thickness $d_{groove}$ of 130 to 140 nm at the groove area. I each case, a power level was employed which provided an eye pattern having a center thereof at the center of a 11T pulse. The amount of the sample material used for measurement of the exothermic calorie in a DTA is shown in FIGS. 12 to 20 at the top of each drawing.

Pigments used in Embodiments and Comparative Examples:

Embodiment 6:

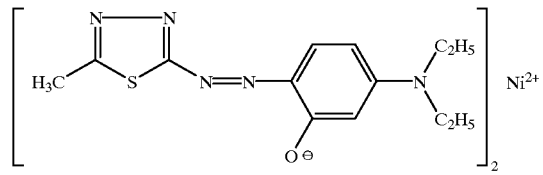

[V]

Embodiment 7:

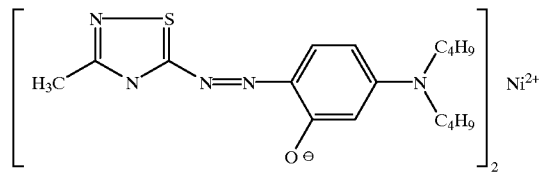

[VI]

Embodiment 8:

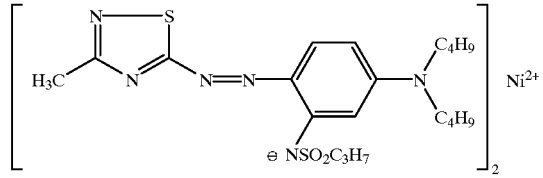

[VII]

Embodiment 9:

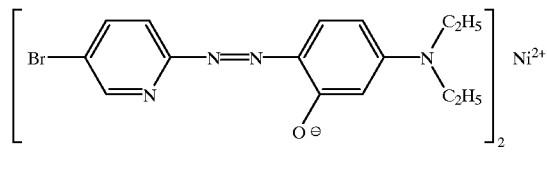

[VIII]

Embodiment 10 and Comparative Example 7:

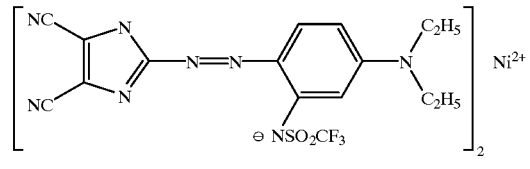

[IX]

Comparative Example 4:

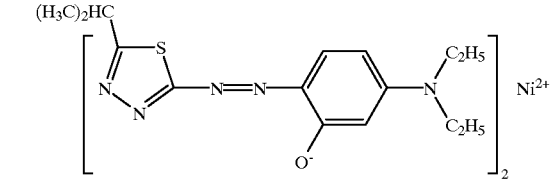

[X]

-continued

Comparative Example 5:

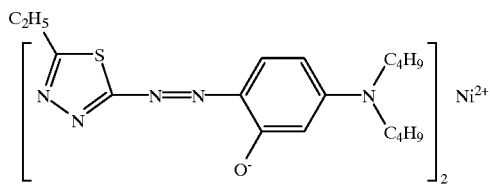

[XI]

Comparative Example 6;

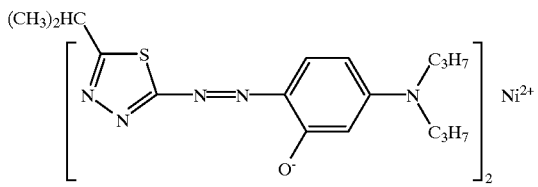

[XII]

(3) Embodiment According to the Fourth Aspect of the Present Invention:

Embodiment 11

A polycarbonate substrate is prepared which had a thickness of 0.6 mm and comprised a U-shaped guide groove having a groove depth of 150 nm and a groove width (half-height width) of 0.25 μm with a track pitch of 0.80 μm, which are measured by AFM method. A metal-containing azo pigment shown by the following formula:

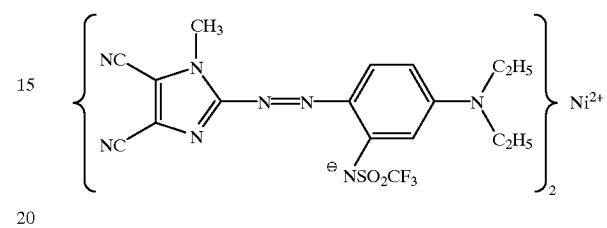

was spin-coated onto the polycarbonate substrate at 1200 rpm. after dissolving 0.044 g of azo pigment into 4 g of octafluoropentanol (OFP), followed by annealing the azo pigment for three hours in an oven heated at 80° C. to form a recording film. The weight reduction property of the pigment is such that the weight reduction in the main weight reduction process, temperature difference, weight reduction rate, and starting temperature of the main weight reduction process were 41.0%, 3.6° C., 11.4%/° C., and 347° C., respectively. The thermogravimetric analysis (TGA) was effected by using a differential thermal analyzer (TG-DTA-320 in SSC5200H series from Seiko Electronic Corp). The refractive index "n" and extinction coefficient "k" of the single layer pigment thus obtained were 2.4 and 0.06, respectively, at a 640 nm wavelength, and the absorption peak occurred at a 588 nm wavelength.

Onto the recording film as described above, gold (Au) was sputtered to a thickness of 100 nm, and the resultant sample was subjected to a measurement of groove depth $d_{film}$ at the

| EXAMPLE | WEIGHT REDUCTION % | TAMP. DIFFERENCE °C. | REDUCTION RATE %/°C. | TOTAL REDUCTION % | EXOTHERMIC PEAK uV/mg | PEAK WIDTH °C. | STARTING TEMP. °C. | ABSORBANCE MAXIMUM nm | Itop % | In/Itop % | ST JITTER ** ns | CROSS-TALK % | GROOVE WIDTH AFTER RECORDING % | AT 640 nm n k |
|---|---|---|---|---|---|---|---|---|---|---|---|---|---|---|
| EXAMPLE 5 | 47 | 7.1 | 6.6 | 59.7 | +3.4 | 14.7 | 313 | 577 | 60 | 68 | 10 | 38 | 1.38 | 2.2 0.06 |
| EXAMPLE 6 | 55 | 18 | 3.0 | 83 | +0.8 | 19.0 | 315 | 586 | 61 | 72 | 10 | 34 | 1.35 | 2.2 0.07 |
| EXAMPLE 7 | 43 | 8.9 | 4.8 | 63 | +3.4 | 16.0 | 290 | 555 | 62 | 84 | 9 | 37 | 1.44 | 2.2 0.04 |
| EXAMPLE 8 | 39.6 | 12.5 | 3.2 | 6b | +2.9 | 12.4 | 251 | 589 | 54 | 72 | 10 | 35 | 1.40 | 2.4 0.08 |
| EXAMPLE 9 | 35.5 | 3.2 | 11.1 | 46 | +20 | 10.7 | 308 | 588 | 68 | 72 | 10 | 42 | 1.50 | 2.48 0.05 |
| EXAMPLE 10 | 37.6 | 14.3 | 2.6 | 45.7 | 3.79 | 14 | 330 | 595 | 65 | 63 | 10 | 39 | 1.40 | 2.6 0.05 |
| COMP. EX. 4 | 38 | 7.1 | 5.4 | 55 | +4.5 | 12.6 | 273 | 575 | 59 | 64 | 9 | 48 | 1.60 | 2.18 0.06 |
| COMP. EX. 5 | 36 | 10.7 | 3.4 | 67.4 | +13 | 10.6 | 276 | 577 | 59 | 68 | 10 | 50 | 1.60 | 2.18 0.07 |
| COMP. EX. 6 | 26 | 5.5 | 4.7 | 53 | +10.3 | 8.4 | 280 | 582 | 61 | 42 | 10 | 45 | 1.60 | 2.18 0.06 |

(BY AFM)
**MINIMUM
MARK LENGTH = 0.4 μm

In Embodiments 5 to 10, the recording power level was 7.4 mW, 6.6 mW, 8.6 mW, 6.4 mW, 6.5 mW and 6.5 mW, respectively, and in Comparative Examples, the recording power level was 7.2 mW, 7.0 mW and 7.2 mW, respectively.

Comparative example 7

A bonded disk was fabricated similarly to Embodiment 6 except for the groove width of 0.35 μm, and subjected to recording similarly to Embodiment 6, which revealed a ratio of 54% for $I_{11}/R_{top}$ which was smaller compared to Embodiment 6. From this result, it is assured that the smaller the groove width, the higher the modulation factor can be obtained.

The optical disks according to the embodiments of the present invention are preferably used in an optical disk drive having a laser source lasing at a wavelength between 500 nm and 700 nm.

coated film by using an AFM, which showed a depth of 54% of the groove depth $d_{sub}$ at the substrate or groove depth before spin-coating. In the sample, the film thickness $d_{land}$ on the land area was 30 nm, and accordingly, the film thickness $d_{groove}$ at the groove area was calculated at 99 nm. On the gold layer as described above, a UV-cured resin (SD-318 from Dainippon Ink And Chemicals, Incorporated) was spin-coated to a thickness of 3 μm, followed by curing by using a UV lamp to form a disk.

Two of the disks thus fabricated were bonded together by a hot melting method to form a bonded disk. The bonded disk was subjected to recording an EFM signal (n−1)T without pulse division, which corresponds to four times the speed of a CD-R disk, at a linear velocity of 3.7 m/s by using a semiconductor laser tester (DDU-1000 from Pulse Tec. Inc.) having a numerical aperture NA of 0.6 and using a 640 nm wavelength. An excellent eye pattern was obtained, wherein the center of the eye is located at the center of a 11T pulse for a recording power level of 6.2 mW. In these conditions, $R_{top}$=50% (reflectivity with PBS) and $I_{11}/R_{top}$= 65% were obtained, and the percent jitter (data to clock jitter) for the minimum mark length of about 0.43 μm was as low as 9%, thereby showing an excellent results of the present invention.

The same bonded disk was subjected to recording a long mark of 11T (440 ns) having a duty ratio of 50% at the power level as described above, which exhibited a low distorted angle θ smaller than 3° in the waveform of the reproduced signal. A higher linear speed of 4.9 m/s was then employed at a power level of 7.2 mW, which provided β=0, for recording a 11T mark (320 ns) having a duty ratio of 50%, which exhibited a low distorted angel θ of 14°.

The bonded disk was then peeled off at the interface, the reflective film was flaked off using a two-sided tape, the pigment was flushed away using ethanol, and the transformation of the substrate was observed in the recorded section by an AFM. The AFM showed a 20 nm convex projection, a peak of the depression located behind the center of the mark by 5.4% in the recorded section recorded at 3.7 m/s linear speed, another peak of the depression located behind the center of the mark by 5.5% in the recorded section recorded at 4.7 m/s linear speed, and a half-height width per a length of the mark of 0.32.

Embodiment 12

A bonded disk was fabricated in the present embodiment similarly to Embodiment 11 except for the pigment which had a chemical structure expressed as follows:

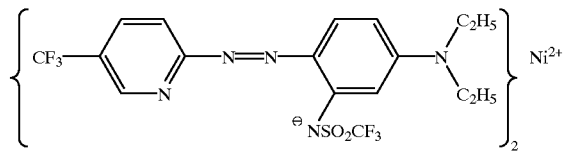

The refractive index "n" and extinction coefficient "k" of the single-layer pigment were 2.36 and 0.06, respectively, at a 640 nm wavelength, and an absorbance maximum occurred at a wavelength of 595.5 nm. The film thickness $d_{land}$ of the recording film at the land area was 35 nm, the groove depth $d_{film}$ at the recording film was 57% of the groove depth $d_{sub}$ at the substrate, and accordingly, the film thickness $d_{groove}$ of the recording film at the groove area corresponded to 110 nm.

The resultant disk was subjected to EFM recording similarly to Embodiment 11 in similar conditions, which showed $R_{top}$=50%, and $I_{11}/R_{top}$=58% and percent jitter for the minimum mark length of about 0.43 μm being 9.5% at a recording power level of 6.2 mW. The same disk was subjected to recording of a 11T mark at a linear speed of 4.9 m/s and a recording power level of 72 mW, and exhibited a distorted angle θ as low as 11°. Protrusions of almost 20 nm height were found as the distortion of the substrate in the recorded section, including a depression therebetween. Although the peak of the depression was located 15.4% behind the center of the mark, the half-height width per the length of the mark was as large as 0.39 and exhibited a significantly large region for the depression. The starting temperature of the main weight reduction for the pigment was 312° C. in a nitrogen ambient, the weight reduction in the main reduction process was 5.18%, the temperature difference was 2.85° C., and the weight reduction rate was 18.2%/° C.

Embodiment 13

A bonded disk was fabricated in the present embodiment similarly to Embodiment 11 except for the amount of the pigment which was 0. 040 g and the pigment which had a chemical structure expressed as follows:

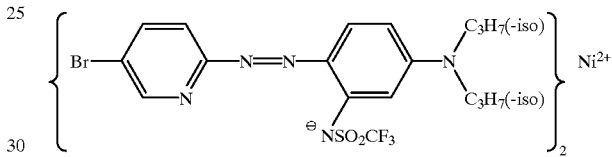

The starting temperature of the main weight reduction for the pigment was 305° C. in a nitrogen ambient, the weight reduction in the main reduction process was 47.7%, the temperature difference was 16.0° C., and the weight reduction rate was 2.98%/° C.

The refractive index "n" and extinction coefficient "k" of the single-layer pigment were 2.5 and 0.08, respectively, at a 640 nm wavelength, and an absorbance maximum occurred at a wavelength of 599.5 nm. The resultant disk was subjected to EFM recording similarly to Embodiment 11 in similar conditions, which showed excellent characteristics wherein $R_{top}$=37%, and $I_{11}/R_{top}$=60% and percent jitter for the minimum mark length of about 0.43 μm being 9.5% at a recording power level of 5.6 mW. The film thickness is selected same as in Embodiment 11. The same disk was subjected to recording of a 11T mark at a linear speed of 4.9 m/s and a recording power level of 7.2 mW, and exhibited a distorted angle θ as low as 3° which was significantly lower as compared to the pigments in Embodiments 11 and 12 having a starting temperature above 340° C. in the main weight reduction. The distortion of the substrate was such that a moderate depression was observed between protrusions of 20 nm height, wherein the peak of the depression was located 3.5% behind the center of the mark, and the half-height width per the length of the mark was 0.32.

Embodiment 14

A disk was fabricated similarly to Embodiment 13 except for a reflective film which was made of silver instead of gold, subjected to recording of a 11T mark at a linear speed of 4.9 m/s, and exhibited a distorted angle θ of 3° and a distortion in the recorded section similar to the case of Embodiment 13. In the present embodiment having a silver reflective film, $R_{top}$ was 42%.

Embodiment 15

A disk was fabricated similarly to Embodiment 12 except for the reflective film which was made of silver instead of gold, subjected to recording similarly to Embodiment 14, and exhibited a distorted angle θ of 14° which was slightly inferior to the case of Embodiment 12. Although the peak location of the depression in the recorded section was similar to Embodiment 12, the half-height width per the length of the mark was 0.36. which was slightly inferior to Embodiment 12.

Embodiment 16

A bonded disk was fabricated, similarly to Embodiment 11, using a substrate similar to that used in Embodiment 11 and a OFP containing a pigment which had a chemical structure expressed as follows:

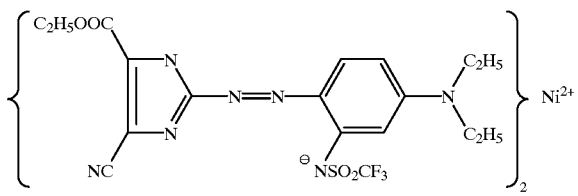

The film thickness was 90 nm at the groove, and the groove depth $d_{film}$ at the coated film was 59% of the groove depth $d_{sub}$ at the substrate. The pigment exhibited an absorbance maximum at a 595.5 nm wavelength, and the refractive index "n" and extinction coefficient "k" of the single-layer pigment were 2.4 and 0.06, respectively, at a 640 nm wavelength. The starting temperature of the main weight reduction for the pigment was 307° C. in a nitrogen ambient, the weight reduction in the main reduction process was 52.3%, the temperature difference was 10.7° C., and the weight reduction rate was 4.89%/° C.

The resultant disk was subjected to EFM recording similarly to Embodiment 11 at a linear speed of 3.7 m/s and a recording power level of 6.3 mW, which showed $R_{top}$=50%, $I_{11}/R_{top}$=65%, and percent jitter for the minimum mark length of about 0.43 μm being 10%. The same disk was subjected to recording of a 11T mark at a linear speed of 4.9 m/s and a recording power level of 7.2 mW, and exhibited a distorted angle θ as low as 8°. Protrusions of almost 20 nm height were found as the distortion of the substrate in the recorded section, which also included a depression having a peak located 5. % behind the center of the mark and a half-height width per the length of the mark was 0.34.

Embodiment 17

A bonded disk was fabricated similarly to Embodiment 11 except for the pigment which had a chemical structure expressed as follows:

The film thickness was similar to that in Embodiment 11. The method for the synthesis of the pigment included a refinement step of suspended washing in methanol, which provided an excellent weight reduction characteristic for the pigment, wherein the starting temperature of the main weight reduction for the pigment was 286° C. in a nitrogen ambient, the weight reduction in the main reduction process was 43%, the temperature difference was 4.8° C., the weight reduction rate was 8.9%/° C. and the pigment exhibited no weight reduction below the main weight reduction. The pigment exhibited an absorbance maximum at a 584 nm wavelength, and the refractive index "n" and extinction coefficient "k" of the single-layer pigment were 2.3 and 0.06, respectively, at a 640 nm wavelength.

The resultant disk was subjected recording of a 11T mark at a linear speed of 4.9 m/s and a recording power level of 8.6 mW, similarly to Embodiment 11, and exhibited a distorted angle θ as low as 5°. The distortion of the substrate was similar to that in Embodiment 11 except for the peak located 5.2% behind the center of the mark and a the half-height width per the length of the mark was 0.34, wherein a difference in the depression was not found between the marks 10T and 11T.

Embodiment 18

A bonded disk was fabricated in the present embodiment similarly to Embodiment 11 except for a metallic reflective film which was made of AlTa including 0.5 at% of Ta, subjected to recording and exhibited excellent results in that $R_{top}$ was 43%, and $I_{11}/R_{top}$=60% and percent jitter for the minimum mark length of about 0.43 μm was 9.5% at a recording power level of 5.8 mW.

The same disk was subjected to recording of a 11T mark at a linear speed of 4.9 m/s and a recording power level of 6.9 mW, and exhibited a distorted angle θ as low as 11°. The distortion of the substrate was similar to that in Embodiment 11 except for the peak located 5.2% behind the center of the mark and a the half-height width per the length of the mark was 0.33.

Embodiment 19

A bonded disk was fabricated similarly to Embodiment 13 except for the pigment which had a chemical structure represented by the following formula:

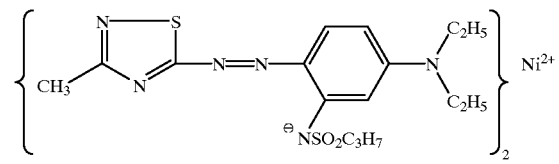

The resultant disk was subjected to EFM recording by using a high-output laser tester (635 nm wavelength and NA=0.6, from Pulse Tech. Inc.) and a 8–16 code multi-pulse generator (from Pulse Tech. Inc.) for DVD-R at a linear speed of 7 m/s and an external clock frequency of 57 MHz, and exhibited excellent characteristics of $I_{11}/R_{top}$=60% at a 14.5 mW power level. A 11T mark was recorded therein at the same linear speed, which exhibited an excellent distorted angle θ of 10° and a distortion of substrate in the recorded section wherein the peak of the depression is located 8% behind the center of the mark and the half-height width per the length of the mark was 0.35. The same disk exhibited an excellent distorted angle as low as 3° for the recording at 4.9 m/s. The pigment exhibited a maximum absorbance at a 593.5 nm wavelength, and n=2.4 and k=0.1 at a 640 nm wavelength. The starting temperature of the main weight reduction in a nitrogen ambient, reduction in the main weight reduction, temperature difference and weight reduction rate were 284° C., 56.9%, 3.6° C. and 15.8%/° C., which were all acceptable.

Embodiment 20

A bonded disk was fabricated in the present embodiment similarly to Embodiment 12 except for the metallic reflective film which was made of AlTa including 0.5 at % of Ta. Recording of a 11T mark at a 4.9 m/s linear speed and a5.7 mW power level exhibited excellent characteristics wherein $I_{top}=40\%$ and $\theta=9°$, which was superior to the case of a silver reflective film. The distortion of the substrate was such that a depression was observed in the vicinity the center of protrusions, the peak of the depression was 9% behind the center of the mark and the half-height width per the length of the mark was 0.36.

Embodiment 21

A disk according to Embodiment 13 and having an exposed metallic reflective film before forming a protective coat was subjected to EFM recording at a 3.7 m/s linear speed, and exhibited an excellent eye pattern similar to that shown by the bonded disk. The TG-DTA curves for the pigment in a nitrogen ambient and atmospheric ambient were similar to each other. The pigment exhibited no weight reduction below the starting temperature of the main weight reduction in an atmosphere.

In the above Embodiments for the fourth aspect of the present invention, the distorted angle $\theta$ in the reproduced signal from a 11T mark recorded at 3.7 m/s was as low as 3°, and accordingly, a percent jitter below 10% was obtained even without using a pulse division technique. Moreover, in the pigments according to the above Embodiments for the fourth aspect of the present invention, there was no weight reduction observed outside the main weight reduction, or below the starting temperature of the main weight reduction, exhibiting excellent characteristics of the pigments.

Embodiment 22

A bonded disk was fabricated similarly to Embodiment 13 except for the groove width in the substrate which was selected at 0.35 μm. Recording of a 11T mark at 4.9 m/s exhibited a distorted angle $\theta$ of 9°. The distortion of the substrate in the recorded section was such that an asymmetry was observed in the height of the protrusions, the peak of the depression was 5.2% behind the center of the mark and the half-height width per the length of the mark was 0.34. which were somewhat different from the case of a 0.25 μm groove width.

Comparative Example 7

A bonded disk was fabricated similarly to Embodiment 11 except for the pigment which had a structure represented by the following formula:

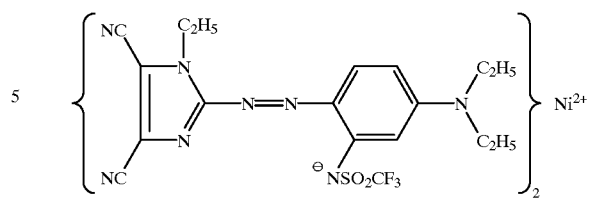

The pigment exhibited an absorbance maximum at a 595.5 nm wavelength, and a refractive index n=2.4 and an extinction coefficient k=0.68 at a 640 nm wavelength. The starting temperature of main weight reduction in a nitrogen ambient, the weight reduction in the main weight reduction process and the temperature difference were 34.6° C., 42.5% and 5.3° C., respectively, which provided a reduction rate of 7.94%/° C. by calculation.

The resultant disk was subjected to EFM recording similarly to Embodiment 11 at 4.9 m/s, and exhibited a percent jitter of 9.8%. Recording of a 11T mark at 4.9 m/s provided a distorted angle $\theta$ of 21° at a recording power level of 7.2 mW, which was not acceptable. The distortion of the substrate in the recorded section was such that a part of a protrusion of around 20 nm height was depressed, and although the peak of the depression was located only 7.7% behind the center of the protrusion, the depression had a significant asymmetry wherein the leading edge thereof is especially depressed to a large extent and the half-height width per the length of the mark was 0.2.

A similar recording is performed to another disk, similar to the present embodiment except for the reflective film which was made of silver in the another disk, and exhibited a distorted angle $\theta$ of 27° in the reproduced signal reproduced from a 11T mark at 4.9 m/s, which was not acceptable. Further, other examples which had 0.040 g and 0.048 g of pigment dissolved in the solvent exhibited unacceptable depressions of the substrate in the recorded section after recording of a 11T mark is performed at 4.9 m/s, exhibiting results similar to the case of 0.044 g of the pigment.

Example

A bonded disk was fabricated similarly to Comparative Example 7 except for addition of 0.0066 g of an additive agent into the pigment, the additive agent having a structure expressed as follows:

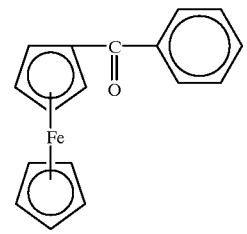

Recording of a 11T mark to the resultant disk exhibited an acceptable distorted angle of 8°, which was superior to Comparative Example 7. The distortion of the substrate in the recorded section was such that a depression was not observed in a protrusion of around 20 nm height and a moderate down slope was observed from the rear edge to the leading edge of the mark. The TG-DTA curve in a nitrogen ambient for the disk having the additive agent was similar to that of the disk before addition of the additive agent, and the starting temperature of the main weight reduction process for the disk after addition of the additive agent was 349° C. The main weight reduction process as used in the text means a weight reduction of more than 18% of the total weight.

Comparative Example 8

A bonded disk was fabricated similarly to Comparative Example 7 except for the substrate which had a thickness of 0.35 µm in this example. Recording of a 11T mark at 4.9 m/s exhibited a distorted angle of 25°. The distortion of the substrate in the recorded section is such that a depression was observed which was far more depressed as compared to Example 7 so that the half-height width could not be determined. The same disk was subjected to EFM recording by using an external clock frequency of 33 MHz and a pulse division technique, similarly to Embodiment 19, and exhibited distortion in the eye pattern and a percent jitter of 12%, which were not acceptable.

Since the above embodiments are described only for examples, the present invention is not limited to the above embodiments and various modifications or alterations can be easily made therefrom by those skilled in the art without departing from the scope of the present invention.

What is claimed is:

1. An optical disk for use at a recording/reproducing wavelength between 500 nm and 700 nm, comprising: a transparent substrate having a guide groove having a groove depth between 100 nm and 200 nm, a groove width between 0.2 µm and 0.3 µm and arranged with a pitch between 0.7 µm and 1.0 µm, defining a groove area and a land area; and a recording film, a metallic reflective film and a protective film consecutively formed on said transparent substrate, said recording film containing an organic pigment selected from the group of materials defined by the following expressions:

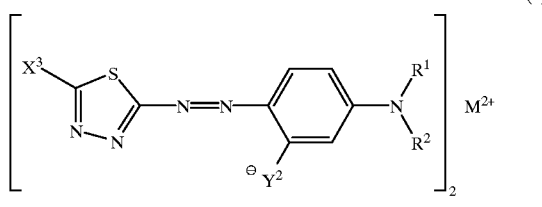

(3)

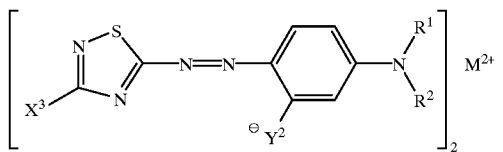

(4)

wherein $X^2$ is a hydrogen atom, an alkyl group having 1 to 7 carbons or a cycloalkyl group having 3 to 7 carbons, and each of $R^1$ and $R^2$ is an alkyl group having 1 to 6 of carbons, methoxymethyl group, ethoxyethyl and $M^{2+}$ represents a divalent ion of nickel, cobalt or copper, $Y^2$ is hydroxyl group, carboxyl group, $SO_3$ or $(NSO_2Y^3)^-$, wherein $Y^3$ is an alkyl group having 1 to 6 carbons which may have a substituent; and

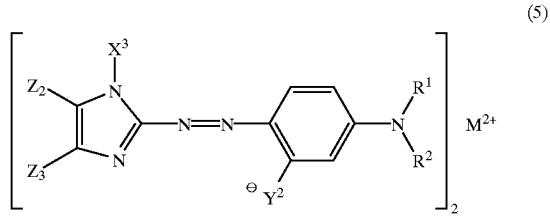

(5)

wherein $Z_2$ and $Z_3$ are electron-withdrawing groups, $R^1$, $R^2$, $X^3$, $Y^2$ and $M^{2+}$ are same as described above, said optical disk satisfying one of the following requirements (a) and (b);

(a) that the film thickness of said recording film at said groove area corresponds to a first interference mound of a disk reflectance, said recording film having an extinction coefficient between 0.03 and 0.09, and said recording film having an absorbance A1 at a wavelength between ±3 nm from the recording/reproducing wavelength and an absorbance A0 of a maximum absorbance or step absorbance most adjacent to A1, such that the ratio of A1/A0 is between 0.07 and 0.18 and A0 resides in a range between 0.5 and 0.7; and that said recording film exhibits, in a thermogravimetric analysis, substantially no weight reduction at temperatures below the starting temperature of the main weight reduction, exhibits a reduction rate of 2%/° C. or more and exhibits a total weight reduction of 35% of more in the main weight reduction, and exhibits, in a differential thermal analysis, an exothermic calorie peak between −10 µV/mg and +10 µV/mg and a peak width of 20° C. or less at exothermic calorie peak;

(b) that said optical disk exhibits a distorted angle θ of 15° or less in a reproduced signal reproduced at a linear speed of 4.9 m/s or above from 10T or larger mark recorded at a linear speed of 4.9 m/s or above.

2. An optical disk as defined in claim 1, wherein a groove width (W1) of the transparent substrate in a recorded section is 1 to 1.5 times a groove width (W0) in an unrecorded section.

3. An optical disk as defined in claim 1, wherein said recording film has a refractive index between 2.2 and 2.8 and an extinction coefficient between 0.03 and 0.09 both at a wavelength between ±5 mm from the reproducing wavelength.

4. An optical disk as defined in claim 1, wherein the thickness of said recording film is between 50 nm and 100 nm at said land area, and the groove depth at said recording film is between 50% and 80% of the groove depth at said transparent substrate.

5. An optical disk as defined in claim 1, wherein the following relationships hold:

$$0.2 \leq n_{abs} \cdot d_{groove}/\lambda \leq 0.65, \quad d_{groove} > d_{land}$$

and $$0.09 \leq \Delta C = (d_{groove} - d_{land}) \cdot n_{abs}/\lambda \leq 0.40,$$

wherein $n_{abs}$, $d_{groove}$, $\lambda$, $d_{land}$ are refractive index of said recording film, film thickness of said recording layer at said groove area, reproducing wavelength, and film thickness of said recording film at said land area, respectively.

6. An optical disk as defined in claim 1, wherein a distortion of said transparent substrate in a recorded section is such that there is substantially no depression in a mark of 10T or longer length, or if a depression is present in the mark, said depression either has a center located within a deviation of ±10% from a center of the mark, or has a half-height width which is larger than a quarter of a length of the mark.

7. An optical disk as defined in one of claims 1 to 6, wherein the width (Lp) of said land area is between 45% and 95% of the width (L) defined by a tangent of both groove walls of said guide groove and a horizontal plane.

8. An optical disk as defined in claim 1, wherein said reflective film has a thermal conductivity between 35 W/mK and 15 W/mK.

9. An optical disk as defined in claim 1, wherein said metallic reflective film is made of Ag or an Ag-based alloy containing one or more of elements selected from the group consisting of Ti, Rh, Cu, Ta, Pd, Ni, V, Co, Cr, Si, C, B, Sn, P, Zn and Mo, in an amount of about 10 atomic % based on Ag.

10. An optical disk as defined in claim 1, wherein said transparent substrate has a thickness of 0.6 mm±0.3 mm.

11. An optical disk as defined in claim 1, wherein said protective film includes a ultra-violet cured resin.

* * * * *